United States Patent
McColgan et al.

(10) Patent No.: US 8,255,482 B2
(45) Date of Patent: Aug. 28, 2012

(54) METHOD AND SYSTEM FOR SPECIFYING, APPLYING AND EXTENDING APPLICATION RELATED ASPECTS THROUGH POLICIES, RULES AND/OR TRIGGERS

(75) Inventors: Brian Edward Anthony McColgan, Mississauga (CA); Gaelle Christine Martin-Cocher, Mississauga (CA); Michael Shenfield, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 90 days.

(21) Appl. No.: 12/333,784

(22) Filed: Dec. 12, 2008

(65) Prior Publication Data

US 2009/0157805 A1    Jun. 18, 2009

Related U.S. Application Data

(60) Provisional application No. 61/013,834, filed on Dec. 14, 2007, provisional application No. 61/056,889, filed on May 29, 2008.

(51) Int. Cl.
G06F 15/16 (2006.01)
H04M 3/42 (2006.01)

(52) U.S. Cl. .................... 709/217; 455/414.1
(58) Field of Classification Search .................... 709/217
See application file for complete search history.

(56) References Cited

U.S. PATENT DOCUMENTS

| | | | |
|---|---|---|---|
| 6,714,778 B2* | 3/2004 | Nykänen et al. | 455/414.1 |
| 2003/0182394 A1* | 9/2003 | Ryngler et al. | 709/217 |
| 2004/0120474 A1* | 6/2004 | Lopponen et al. | 379/88.17 |
| 2004/0122901 A1* | 6/2004 | Sylvain | 709/206 |
| 2005/0262195 A1* | 11/2005 | Ono et al. | 709/203 |
| 2006/0010240 A1* | 1/2006 | Chuah | 709/228 |
| 2006/0031407 A1* | 2/2006 | Dispensa et al. | 709/219 |
| 2006/0046758 A1* | 3/2006 | Emami-Nouri et al. | 455/518 |
| 2007/0091907 A1* | 4/2007 | Seshadri et al. | 370/401 |
| 2007/0121580 A1* | 5/2007 | Forte et al. | 370/351 |
| 2007/0223462 A1 | 9/2007 | Hite et al. | |
| 2007/0270163 A1* | 11/2007 | Anupam et al. | 455/456.1 |
| 2007/0270166 A1* | 11/2007 | Hampel et al. | 455/456.3 |
| 2008/0101584 A1* | 5/2008 | Gray et al. | 379/221.08 |

FOREIGN PATENT DOCUMENTS

| | | |
|---|---|---|
| CA | 2545987 | 9/2006 |
| WO | 01/45342 A2 | 6/2001 |
| WO | 2006/115442 A1 | 11/2006 |
| WO | 2007015726 | 2/2007 |

OTHER PUBLICATIONS

International Application No. PCT/CA20081002160, International Search Report and Written Opinion dated Apr. 7, 2009.

(Continued)

*Primary Examiner* — Kenny Lin
*Assistant Examiner* — Gerald Smarth
(74) *Attorney, Agent, or Firm* — Brinks Hofer Gilson & Lione

(57) ABSTRACT

A method and system for the creation of aspects from a service or application, the method defining related service aspects; inserting or encapsulating service aspects as named aspects into an abstraction layer in an execution environment; and associating the named aspects with logic in the abstraction layer to support application or service function points.

23 Claims, 14 Drawing Sheets

OTHER PUBLICATIONS

Brian McColgan, "Presence Access Layer WID", submitted to OMA TP, May 30, 2008 (OMA-TP-2008-0105-INP_PAL_WI_for_presentation.ppt).

OMA Work Item Document entitled "Presence Access Layer WID" dated Jun. 2, 2008.

Takeshi Nakatsuru et al., "context-aware information provision to the mobile phone standby screen", Proc. of the 7th International Conference on Mobile Data Management (MDM'06), May 10-12, 2006 (Oct. 5, 2006), pp. 1-7.

Mohamed Khedr et al., "ACAN—Ad hoc Context Aware Network", 2002 Canadian Conference on Electrical and Computer Engineering (IEEE CCECE 2002). vol. 3, May 12-15, 2002 (Dec. 5, 2002), pp. 1342-1346.

PCT/CA2008/002159, International Search Report mailed Apr. 6, 2009.

PCT/CA2008/002162, International Search Report mailed Mar. 30, 2009.

PCT/CA2008/002160, International Search Report mailed Mar. 31, 2009.

Extended European Search Report for European Patent Application No. 08863123.9, dated May 18, 2011, 11 pages.

Open Mobile Alliance: "Presence SIMPLE Specification, OMA-TS-Presence_SIMPLE-V2_0-20071128-D", Open Mobile Alliance, Nov. 28, 2011, 94 pages.

Khartabil et al., Functional Description of Event Notification Filtering; IETF Standard, Internet Engineering Task Force, IETF, Ch, Sep. 1, 2006, 32 pages.

Khartabil et al., "An Extensible Markup Language (XML)-Based Format for Event Notification Filtering", IETF Standard, Internet Engineering Task Force, IETF, Ch, Sep. 1, 2006, 24 pages.

Australian Examination Report, dated Apr. 5, 2012, for Application No. AU2008338195 (pp. 2).

Canadian Office Action, dated May 30, 2012, for Application No. CA2,708,375 that corresponds to U.S. Appl. No. 12/333,710 (pp. 3).

European Examination Report, dated Jun. 8, 2012, for Application No. EP08863123.9 (pp. 10).

Canadian Office Action, dated May 30, 2012, for Application No. CA2,708,540 (pp. 3).

* cited by examiner

METHOD AND SYSTEM FOR SPECIFYING, APPLYING AND EXTENDING APPLICATION RELATED ASPECTS THROUGH POLICIES, RULES AND/OR TRIGGERS

CROSS-REFERENCE TO RELATED APPLICATIONS

The present application claims the benefit of U.S. Provisional Patent Application 61/013,834; filed Dec. 14, 2007, and U.S. Provisional Patent Application 61/056,889, filed May 29, 2008, the entire disclosures of which are incorporated by reference herein in their entireties.

FIELD OF THE DISCLOSURE

The present disclosure relates to application context awareness, and in particular to application context awareness in a mobile network.

BACKGROUND

Applications possess functional utilities that have important characteristics known as context. Context is defined as "the set of information which surrounds, and gives meaning to something else". Examples of context can be found, for example, in presence applications, location applications, among others.

With regard to presence information, presence metadata provides meaning and the presence information is the basis of the context. The meaning is applied to or part of a particular function or a particular feature of a function within an application to establish an appropriate set of processing steps.

In one example, an instant message (IM) client application operable on a first user's mobile device may require functionality to establish whether other individuals or peers are reachable to permit the first user to initiate an IM chat session. It is also possible that within an IM client, functionalities are required to establish a peer user status icon to represent a second user. In the first scenario, context relates to whether the second user is reachable to initiate a chat. In the second scenario, the first user's IM client discriminates and derives a status icon based on the second user's status and availability to display the correct status icon, indicia or avatar. In the context of the IM client, reachability as it relates to peer status icon feature may not be relevant, whereas reachability is helpful for facilitating the initiated chat function.

The above demonstrates, in a presence environment, that context plays a significant role in how an individual's presence information may be computed to derive presence related aspects, including reachability, availability, among others. As will be appreciated, context also applies in other scenarios besides presence.

A presence service captures presence information from one or more presence sources. Once this data is collected, a presence service composes the captured metadata and distributes a raw presence metadata document to authorized watchers. The OMA-Presence service platform is a demonstrative example of a presence service. The OMA-Presence enabler outlines, in very detailed written form, semantics and policy related to the publication and consumption of presence information.

BRIEF DESCRIPTION OF THE DRAWINGS

The present disclosure will be better understood with reference to drawings in which.

DETAILED DESCRIPTION

Terms:

In the present description the following terms are used and defined as follows:

Context That which surrounds, and gives meaning to something else.

OMA Open Mobile Alliance

PEEM Policy Evaluation, Enforcement, and Management Enabler

Presence Info A basic unit of presence (e.g. activity or mood is presence information).

Presence Service Entity or platform that receives presence information from presence sources.

Presence Source Entity that relates presence info on behalf of 1+ presentities.

Presentity Entity that has presence information related to it.

Watcher Entity that wishes to consume presence information.

Context Aware Layer A Layer that may be an access, application abstraction or proxy layer. This layer may make use of aspects. This layer may be deployed over a network and may be adapted to handle requests from a plurality of clients of various types. This layer may include context aware mechanisms such as, for example an x/CAM, which is a non-specific (generic) context aware mechanism, or specific mechanisms such as presence (p/CAM) and location (L/CAM).

Description:

The present disclosure provides a method of enabling a context aware mechanism in an execution environment, the method comprising: defining aspects that at least one application employs, an aspect being an application level abstraction relevant to a source or service; associating at least one of rules and triggers against said aspects from the defining step; and associating policies with a context at a point in an application lifecycle, said policies being used as a basis for evaluating rules within the context aware mechanism, wherein said aspects, rules and policies enable said at least one application to abstract functionality to the context aware mechanism.

The present disclosure further provides a context aware mechanism comprising: aspects, said aspects being application level abstractions related to a context; rules and triggers providing a sequence of steps or logic employed to compute aspects; and policies associated with a context at a point in an application lifecycle, said policies being used as a basis for evaluating rules within the context aware mechanism, wherein said aspects, rules and policies enable at least one client to abstract functionality to the context aware mechanism.

Figure 1:
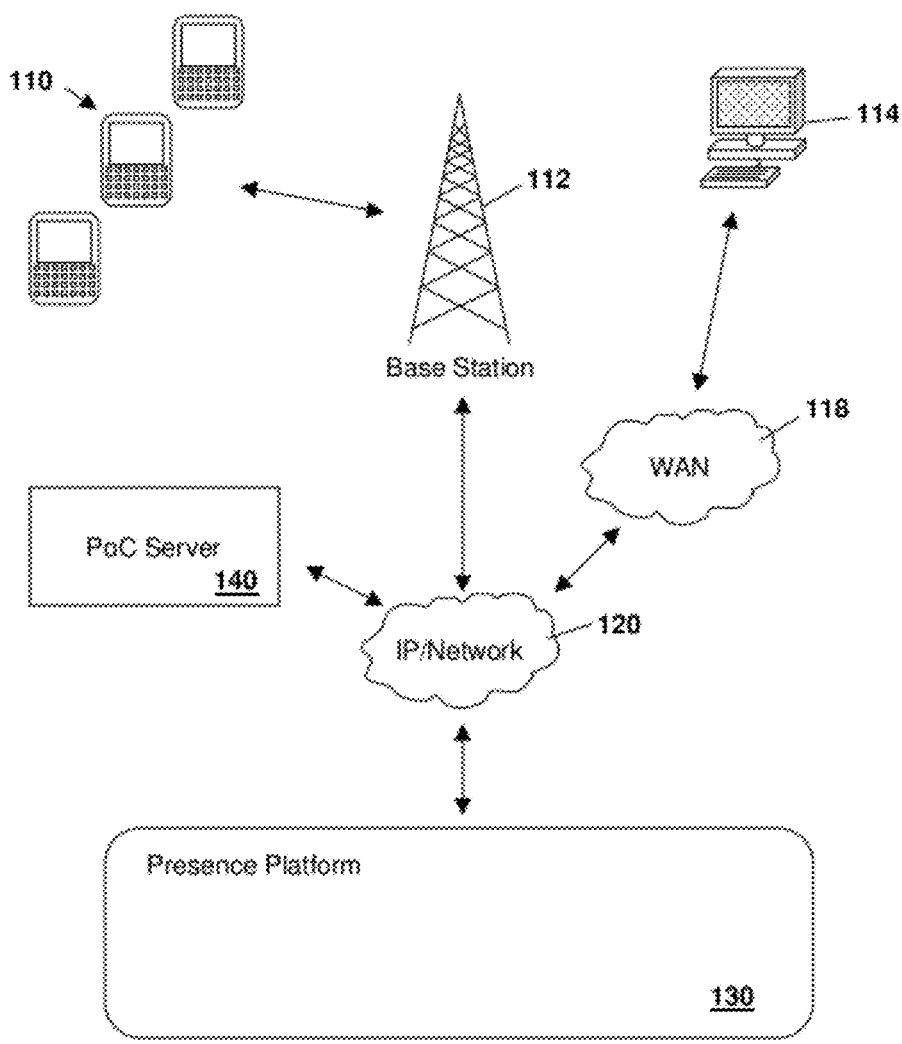
FIG. 1 is a block diagram showing an example presence platform with a push to talk over cellular client and server.

FIG. 1 illustrates a block diagram of an example presence platform being employed in the context of a push to talk over cellular (PoC) system. The use of a presence platform is merely an example, and other platforms such as a location or generic platform are possible. Furthermore, the presence platform (or other location or generic platform) may be employed in other contexts such as, for example IM. Specifically, in FIG. 1, user devices 110 communicate over a wireless communication (e.g., cellular) system with a base station 112, which then communicates with an Internet Protocol network 120 or other network as known to those skilled in the art. As will be appreciated, base station 112 could be a base station for any known wireless communication (e.g., cellular, PCS, iDEN, etc.) service. Further, devices 110 could communicate with a network 120 throughout other means such as a short range wireless communication like Bluetooth™, over WiFi or WLAN, through a wired connection such through a USB or Serial port or through a computer modem. Indeed, other means of connecting to network 120 would be known to those skilled in the art.

In the system of FIG. 1, a desktop 114 (e.g., a computing device that is similar or different than user devices 110) with a PoC client can communicate with one or more of the user devices 110 through a wide area network 118 and network 120.

A presence platform 130 receives and sends out presence information flow from network 120 to user devices 110 or desktop 114. Presence platform 130 is adapted to store raw data regarding states of clients and to update client records when new state data is received. Presence platform 130 is further adapted to provide presence information to a watcher. Thus presence information flows both to and from presence platform 130.

A push talk over cellular (PoC) server 140 exists within the system of FIG. 1 and in one embodiment could publish state information on behalf of a presentity or a watcher. As will be appreciated by those skilled in the art with reference to FIG. 1, the consumption and interpretation of presence metadata to achieve functions or features within the context of an application relating to a subject of interest may be performed by the application. An application in this case could be the PoC server, a PoC client or an IM client, among others.

User devices 110, desktop 114 and PoC Server 140 could act as both watchers and presence sources in the example of FIG. 1.

As will be further appreciated by those skilled in the art, the requirement for the consumption and interpretation of presence metadata to achieve functions or features within the context of an application increases the complexity of a client application. Undesirably, this complexity has the net effect of increasing the associated memory footprint as well as the overall processing, power consumption and network bandwidth requirements for the application. In addition, a presence related application further becomes susceptible to changes or additions to the underlying metadata or changes presence platform semantics or policy. For example, a bug fix or a change in the OMA standards could require a client application to be updated or changed in order to correctly interpret metadata in the future. Also, metadata could be added or changed in presence semantics.

The above has the net effect of frequent changes to the application deployed within a user's execution environment in order to properly maintain an appropriate watcher and/or presentity view. There is also a further time cost and cost related to the deployment of a given application.

Figure 2:
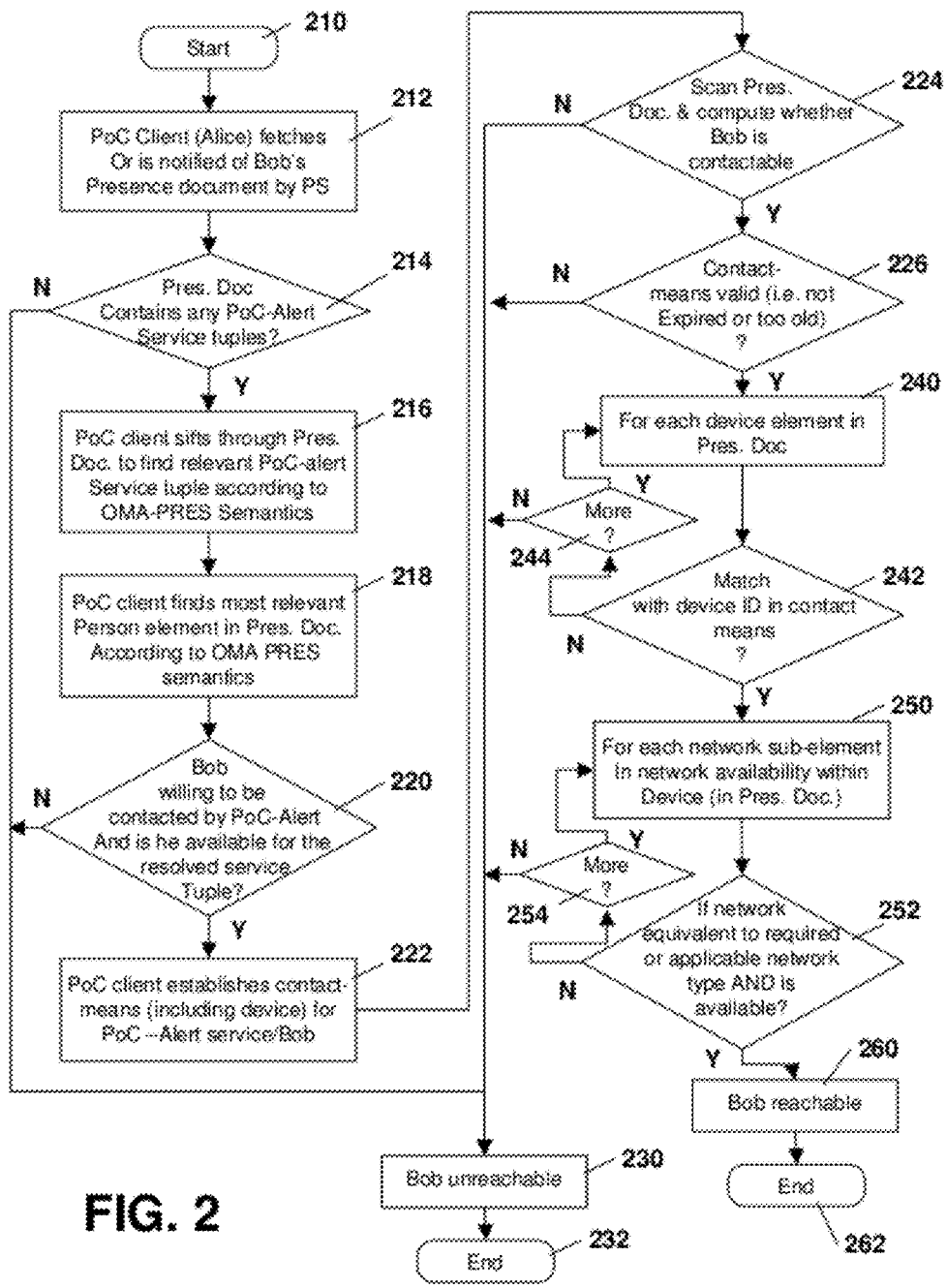
FIG. 2 is a flow diagram illustrating an example processing method on a client device for deriving reachability aspects.

This is further illustrated with reference to the example of FIG. 2. Reference is now made to FIG. 2, which shows a flow chart of an example transaction in which a PoC client application is to initiate a PoC-alert to a subject of interest. In this case, a first user, Alice, wishes to send a PoC alert to a presentity, Bob, using her PoC client (a watcher).

The process starts at block 210 and proceeds to block 212 in which the PoC client fetches or is notified of Bob's presence document by a presence server. As will be appreciated by those skilled in the art, when service is implemented for Bob and Alice to be able to push-to-talk to each other, either a subscription is made with the presence server to provide a presence document related to Bob, or when the PoC wishes to communicate with Bob then a fetch is done from the presence server and this information is received as a presence document in block 212.

The process then proceeds to block 214 in which a check is made to see whether the presence document contains any PoC alert service tuples. As will be appreciated, this is a check to see whether or not anything in the presence document is related to the service identifier for this service (in this case the PoC alert service).

If, in block 214, the presence document does contain PoC-alert service tuples the process proceeds to block 216 in which the PoC client sifts through the presence document to find relevant PoC-alert service tuples according to the OMA presence semantics. As will be appreciated, this provides a way to distill out relevant information for the service being requested. The client in this case employs embedded knowledge of the OMA presence semantics in order to do this.

The process then proceeds to block 218 in which the PoC client finds the most relevant person element in the presence document according to the OMA presence semantics. As will be appreciated, the presence document could include multiple person elements. OMA/Presence defines semantics for determining the most relevant person.

The process, in block 220, next checks to see whether Bob is willing to be contacted by PoC-alert and if he is available for the resolved service tuple. As will be appreciated, the terms "willing" and "available" are specific to presence and have predefined criteria for resolving whether or not someone is "willing" and/or "available."

If Bob is "willing" and "available," the process proceeds to block 222 in which the PoC client establishes contact means including the device for the PoC alert service for Bob. As will be appreciated, multiple addresses could be provided and priority for those addresses could also be provided.

The process then proceeds to block 224 in which a check is made to see whether Bob is "contactable." Again this has a specific meaning within the presence semantics and indicates that if Bob is "willing" and "available" then a contact means may be established.

The process then proceeds to block 226 if Bob is "contactable." At block 226 a check is made to see whether the contact means is valid. The contact means may be invalid if it is expired or if it is too old and a time limit on the validity of the context means has been placed, among others.

From blocks 214, 220, 224, or 226 if a negative conclusion is reached the process proceeds to block 230, which indicates that Bob is unreachable, and the process ends at block 232.

From block 226, if the contact means is valid the process proceeds to block 240 in which each device element in the presence document is identified. For each presence document the process proceeds to block 242 in which the device identifier is matched with the contact means. If a match is made the process proceeds to block 250. Otherwise the process proceeds to block 244 in which a check is made to see whether there are more device elements available. If yes, the process proceeds back through block 240 and 242. Otherwise, the process proceeds to block 230 in which Bob is deemed unreachable and the process ends at block 232.

At block 250, the process isolates each network's sub-element in network availability within the device and a check is made at block 252 to see if the network is equivalent to the required or applicable network type for the PoC alert service, and that the network is available. This is a decision that the client application makes based on policy, or it may be embedded in the client (or server) talking to the P/CAM layer. If the process of block 252 receives a positive result, the process proceeds to block 260 in which Bob is deemed reachable and the process then ends at block 262.

Otherwise, the process proceeds to block 254 in which a check is made to see if there are other network sub-elements that can be utilized and if yes the process proceeds through blocks 250 and 252 again to make the check to see whether or not the network is equivalent to the required or applicable network type and is available. From block 254, if no other network subtypes are available the proceeds to block 230 in which Bob is deemed unreachable and process ends at 232.

Having regard to FIGS. 1 and 2 above, the contextual interpretation of presence information may be embedded within each client application. Each client application can receive a different or the same set of presence metadata and in situations where multiple applicants share the same raw presence metadata, the fact that the contextual interpretation is individually tied to each of them increases the possibility that two different client applications will arrive at differing conclusions about a specific presence aspect. This may not provide the desired outcome and may lead to interoperability issues, particularly between client applications that share or treat specific presence aspects in an orthogonal and consistent manner.

For example, an email and an IM client that both derive a person's reachability from the same raw presence document may come to different conclusions as to whether someone is reachable based on subtle variations in each client application's presence processing steps. This may result in the email client concluding that the person is reachable while the IM client determines that the individual is unreachable. In addition to a bad quality of service, this could result in issues with interoperability such as not being able to spawn an IM chat session from an email client when reviewing an individual's email due to a state mismatch error.

Abstracting raw presence information into a dedicated context aware layer which supports "presence aspects" based on contextual rules and policies allows for the possibility of applications to work collaboratively to achieve derived functionality and to carry out intelligent workflows as a result of a compound context presence. For example, a project manager wishes to host a project status meeting. The project manager establishes a meeting invitation (e.g., from an enterprise email/calendaring application) on her desktop execution environment to meeting participants. A presence-context platform working on behalf of the mail/calendaring application may be able to support the following types of functions as a result of the user initiating the invite:

Determine an appropriate time based on participant availability;

Based on contextual policy, book an appropriate meeting room for the meeting;

Determine based on participant location (and enterprise policy) whether a conference bridge must be booked (and reflect this to appropriate individuals in the meeting request);

Based on hints or policy given by the meeting moderator through the application, invite relevant participants who fulfill a given criteria (e.g. a member of the marketing team, a member of the development team, a member of the quality assurance (QA) team, an individual with a specific skill or knowledge, etc.).

Further, various application servers can integrate the presence context aware mechanism (P/CAM) to gain efficiency by reducing the number of communication and processing steps. For example, a mobile advertisement server could integrate with a P/CAM to simplify and streamline its presence aspects to focus on core functionality such as the delivery of contextually relevant mobile advertisements.

The present disclosure provides for a method and system for establishing a context where a mechanism is connected with a server platform to support a given application. Context awareness resides in whole or in part within the network and provides a composite view of presence/location or other related aspects to an application or multiple applications on behalf of various entities such as a given presentity and/or watcher in the presence case. For each case, this is achieved by associating rules, triggers, and policies against presence related aspects such as availability, contactability, reachability, state, among others, into a context aware layer. Rules or triggers may be extended or overridden to provide additional or application specific behavior to different classes of applications or enablers.

Context awareness may be replicated to a presence or location context aware mechanism connected with a presence or location service platform to provide a client application or a service with location related aspects. A location context aware mechanism (L/CAM) makes use of location information provided by a location enabler, location information stored in a presence service or other location information store. For example, the location could be derived using GPS, base station, or extended cell tower information.

Location specific rules and policies are associated against location related aspects such as within a geographical area, who is close by, am I there yet, among others, into a location context aware layer. As with a P/CAM, rules or triggers may be extended or overridden to provide additional/application specific behavior to different classes of applications or service enablers.

Similarly, a "generic" context aware layer (context aware mechanism) could contain a combination of a P/CAM, L/CAM and specific application context aware mechanism. An example could be a mobile advertising platform where presence, location and campaign related information are used in combination to target advertisements of interest towards a user. Other generic platforms could include a network address book service, a network community service, among others.

As will be appreciated by those skilled in the art, a context aware mechanism is applicable to both a wired and wireless execution environment and computing domain. This approach has several benefits including a dramatic reduction in the complexity of an associated application running within a user's execution environment. A contextually aware platform located on the network permits a given client application or enabler to focus on its core competency such as chat within an IM client, visualizing a person's location in a location client, among others. Functionality is achieved by injecting (e.g., at execution time) the applicable policies and by invoking specific rules and/or triggers relevant to the context of the client application or the enabler to provide utility on behalf of the user.

In a further embodiment, a context aware platform or context aware layer includes both an x/CAM server and an x/CAM client or agent that work in concert. Further, in some embodiments of the x/CAM, the same distributed or non-distributed aspects as the P/CAM and L/CAM mentioned above are possible. For instance, the context aware layer may exist only server side in some embodiments. The context aware layer client or agent is embedded within an execution environment. The interface to a context aware platform may be web-centric. Examples include extensible markup language (XML) web services such as simple object access protocol (SOAP), representational state transfer (REST) or XML over hypertext transfer protocol (HTTP). The above supports a context aware layer deployment scenario whereby an application or enabler could directly interact or manipulate the context aware mechanism to more closely model the appropriate behavior. For example, a mobile advertising server co-located with a P/CAM agent could be used to override presence policies to better align presence with the underlying functionality of the platform. For example, a mobile advertising server can integrate or make use of an x/CAM 'layer'. Such x/CAM could be a superset of a P/CAM, L/CAM and specific advertisement/CAM.

Figure 3:
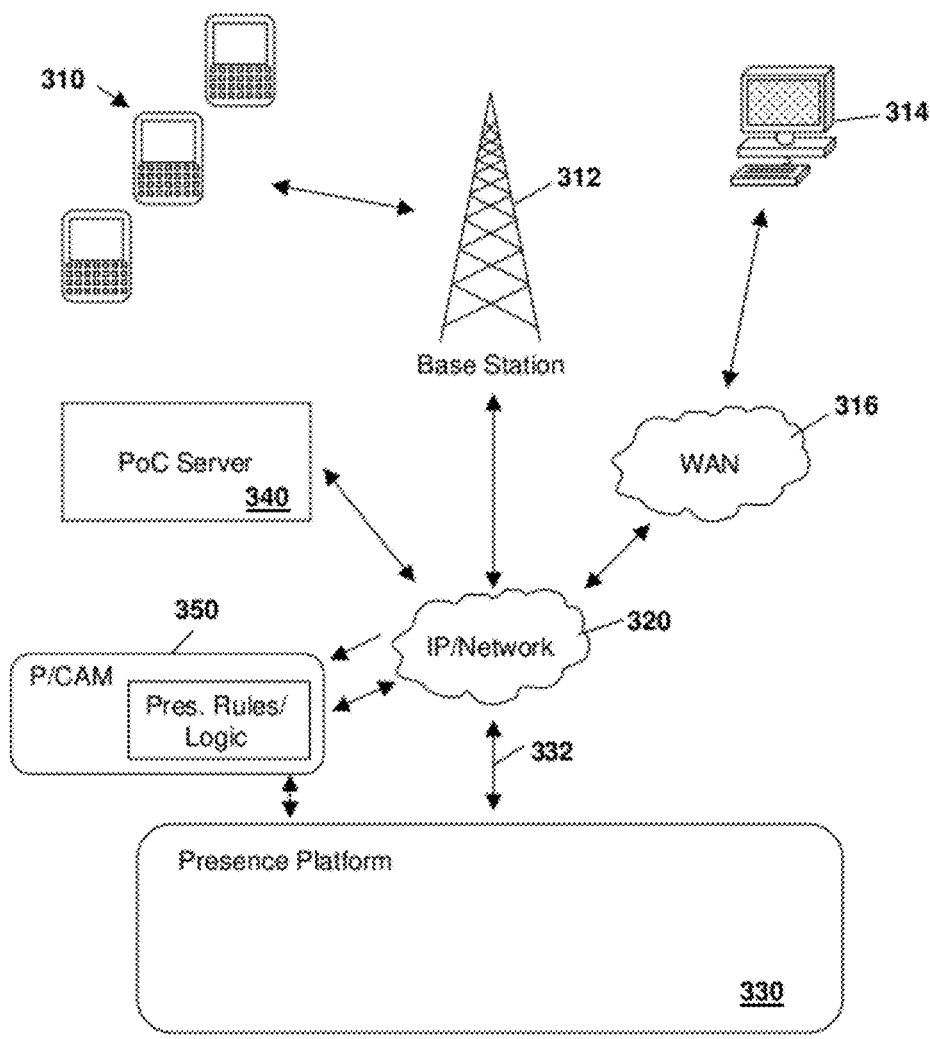
FIG. 3 is a block diagram showing an example presence system in which a presence context aware mechanism has been added.

Reference is now made to FIG. 3. FIG. 3 illustrates a system diagram for a presence platform with a PoC client application utilizing a P/CAM as the context aware layer. As will be appreciated, FIG. 3 utilizes similar network aspects to those of FIG. 1 with the addition of the P/CAM.

In FIG. 3, user devices 310 communicate through a base station 312 to a network 320. Further, a desktop 314 (e.g., a computing device that is similar or different than user devices 310) communicates through a wide area network 316 with network 320.

A presence platform 330 is adapted to store raw data and state updates that have been received from clients.

Further, a PoC server 340 exists and is adapted to publish or consume state information on behalf of users.

A presence context aware mechanism server 350 provides the context aware layer and communicates with network 320 and receives policies, dynamic rules and/or triggers from clients over network 320 and further publishes and receives presence aspects through network 320.

A presence context aware mechanism server 350 further communicates with presence platform 330 to provide and receive presence information flow.

FIG. 3 further illustrates a link 332 between network 320 and presence platform 330. As will be appreciated, this link 332 may not be omitted despite the communication link between presence platform 330 and P/CAM server 350 in order to allow clients who want to communicate directly with the present platform the ability to do so or to provide for communications with the platform for new information or advanced information that the P/CAM server 350 may not yet be aware of.

Based on the above, P/CAM server 350 receives policies, rules and triggers and is adapted to provide and receive presence aspects based on these rules and logic to clients such as devices 310 or desktop 314, or PoC server 340.

As will be appreciated, in other embodiments, various aspects or functionality of the P/CAM can be distributed throughout the network and in some instances the entire P/CAM can be placed onto other devices or clients within the network.

Figure 4:
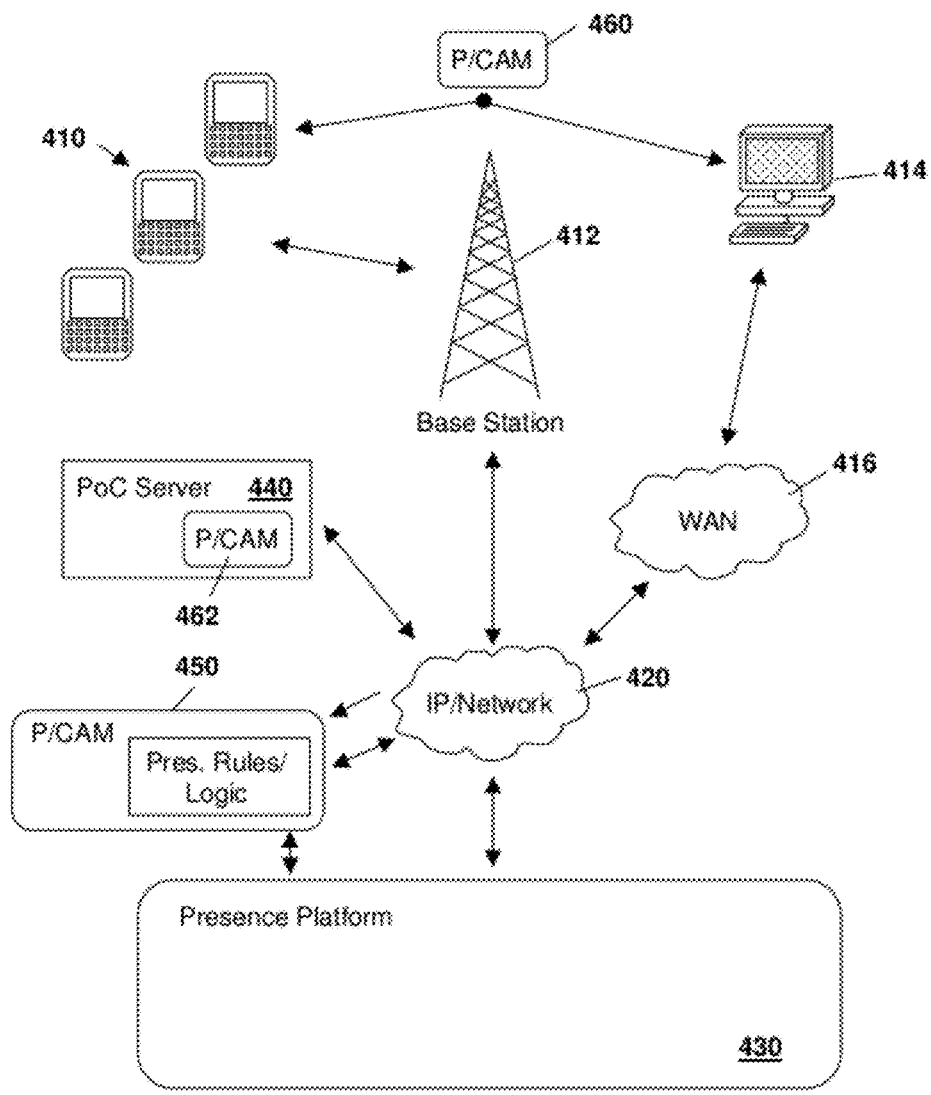
FIG. 4 is a block diagram showing an example presence system in which a presence context aware mechanism has been added and distributed between a server and agents.

Reference is now made to FIG. 4. FIG. 4 shows a system similar to that of FIGS. 1 and 3 in which the P/CAM functionality has been distributed through P/CAM agents on various devices.

Specifically, user devices 410 communicate through a base station 412 with network 420. Further, a desktop 414 (e.g., a computing device that is similar or different than user devices 410) communicates over a wide area network 416 with network 420.

A presence platform 430 is adapted to store raw data and state updates that are received from clients.

Further, a PoC server 440 is adapted to communicate with network 420 and publish or consume state on behalf of client applications.

The context aware layer embodied as a P/CAM server 450 is adapted to communicate with network 420 and to receive policy, rules and thresholds and provide and receive presence aspects to and from clients such as user devices 410 and desktop 414 through P/CAM agent 460 or PoC server 440 through P/CAM agent 462.

P/CAM 450 is further adapted to communicate with presence platform 430 to receive and send presence information flow.

In the embodiment of FIG. 4, some of the functionality of P/CAM server 450 may be distributed in order to allow the full functionality of the P/CAM, or part of it, to be performed on the device 410, desktop 414 or PoC server 440, for example. This is illustrated by P/CAM agent 460 on user devices 410 or desktop 414 and P/CAM agent 462 on PoC server 440. In this case, the context aware layer comprises both P/CAM server 450 and P/CAM agent 460 and/or 462.

P/CAM agent 460 or 462 could contain rules and/or policies that are predefined. Further, the P/CAM agent 460 or 462 can be used to manipulate presence information or interoperate with metadata or clients on the host execution environment in some embodiments.

As will be appreciated, in some embodiments the entire P/CAM can be located on a client or other server.

Figure 5:
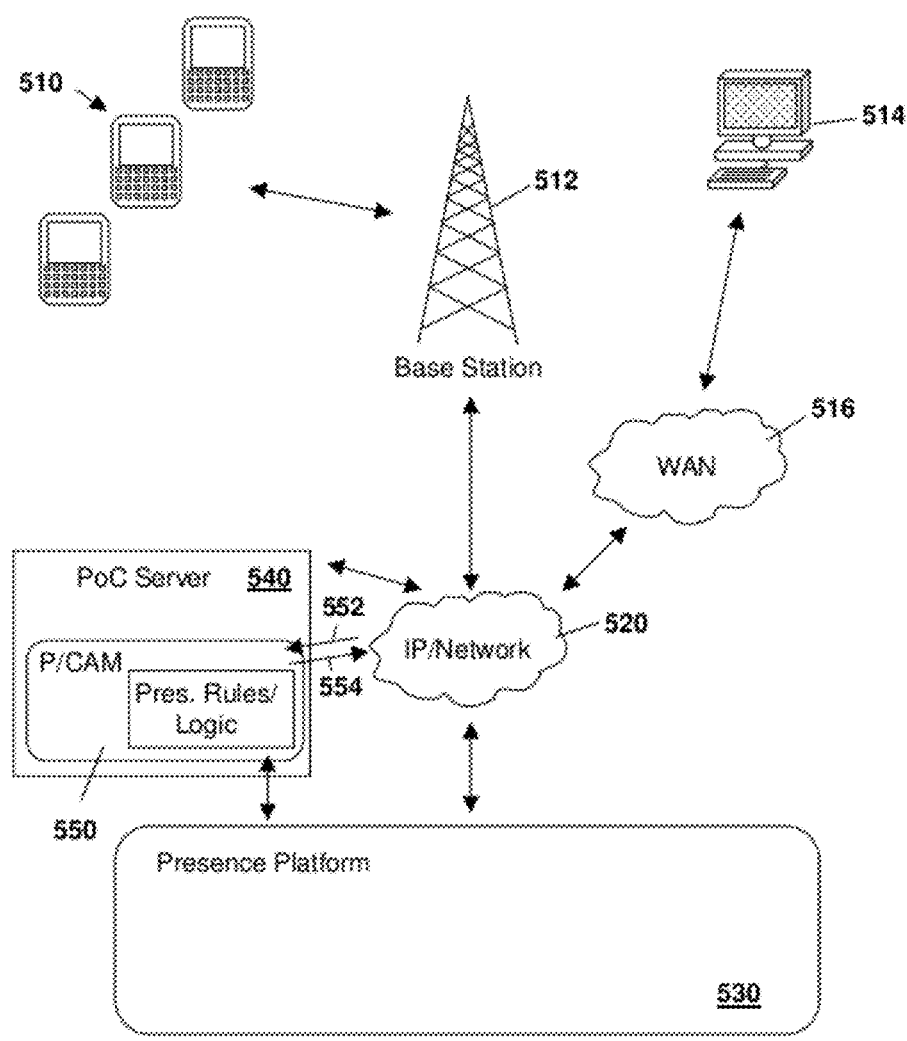
FIG. 5 is a block diagram showing an example presence system in which a presence context aware mechanism has been added to a PoC server.

Reference is now made to FIG. 5. FIG. 5 illustrates a system diagram in which the P/CAM server (context aware layer) is embedded within the PoC server.

Specifically, in FIG. 5, user devices 510 communicate through base station 512 with a network 520. Further, desktop 514 (e.g., a computing device that is similar or different than user devices 510) communicates over a wide area network 516 and to network 520.

A presence platform 530 is adapted to store raw data and updates received from clients regarding presence.

A PoC server 540 is adapted to communicate with network 520 and to publish or consume state on behalf of clients.

PoC server 540 further includes P/CAM 550 embedded therein. P/CAM 550 communicates with presence platform 530 to exchange presence information flow and further communicates over network 520 to receive policy information, rules and thresholds and to further receive and publish presence aspects. Specifically, communications 552 provide P/CAM 550 with policy and dynamic overloaded rules, whereas communications 554 provide network 520 with presence aspects.

Further, an implementation could be defined as a P/CAM layer integrated within an enabler, e.g.: as part of the Presence Platform itself. The latter implementation, as illustrated in FIG. 6, could also support a variation whereby a context aware layer embodied as a P/CAM client/agent resides on the mobile device and/or as part of an associated enabler (e.g. a MobAd server).

Figure 6:
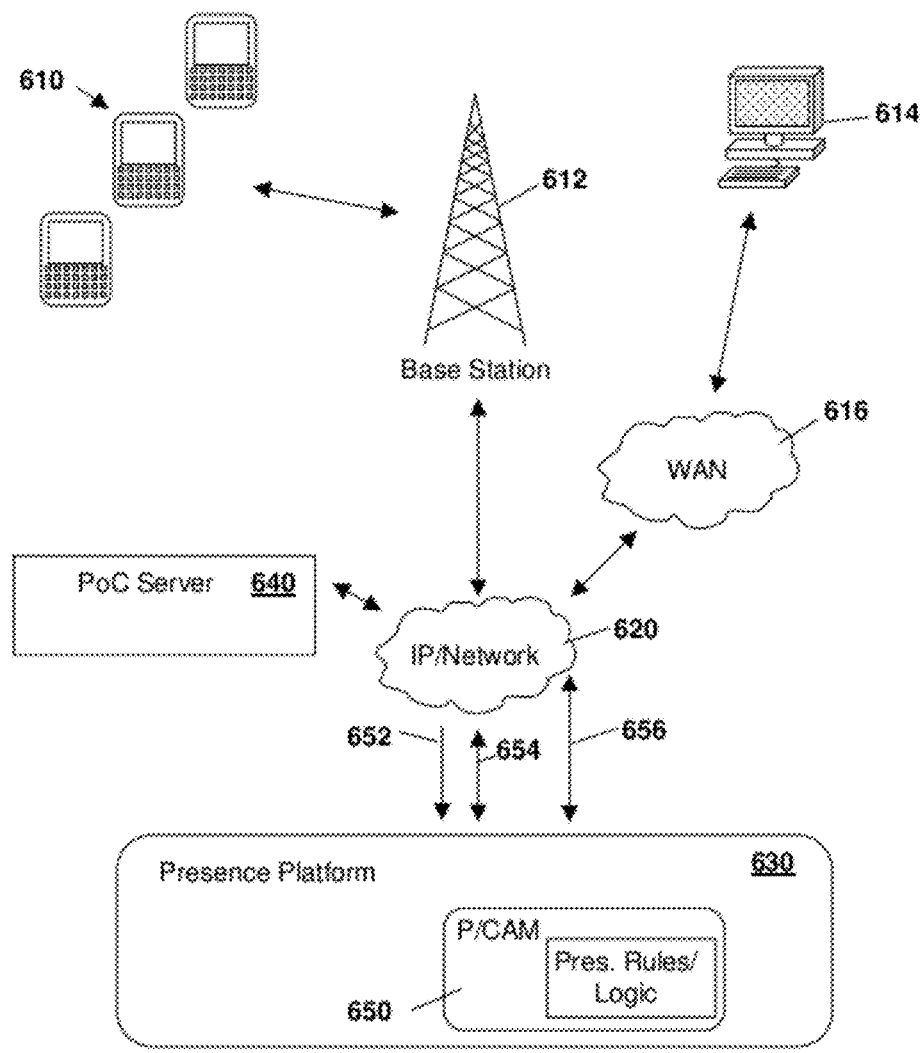
FIG. 6 is a block diagram showing an example presence system in which a presence context aware mechanism has been added to a Presence Platform.

Reference is now made to FIG. 6. FIG. 6 illustrates a system diagram in which the P/CAM server is embedded within the presence platform 630.

Specifically, in FIG. 6, user devices 610 communicate through base station 612 with a network 620. Further, desktop 614 (e.g., a computing device that is similar or different than user devices 610) communicates over a wide area network 616 with network 620.

A presence platform 630 is adapted to store raw data and updates received from clients regarding presence.

A PoC server 640 is adapted to communicate with network 620 and to publish or consume state on behalf of clients.

Presence platform 630 further includes P/CAM 650 embedded therein. P/CAM 650 communicates with presence platform 630 to exchange presence information flow and further communicates over network 620 to receive policy information, rules and thresholds and to further receive and publish presence aspects. Communication 652 shows policy/dynamic overloaded rules being received from network 620. Communication 654 shows presence aspects being sent and received between presence platform 630 and network 620. Communication 656 shows presence information flow between presence platform 630 and network 620.

As will be appreciated with reference to FIGS. 3, 4, 5 and 6, context awareness reduces network latency by reducing the amount of data transmitted between a user's execution environment and a presence platform. This is helpful in a wireless domain where CPU usage, battery consumption and network bandwidth are precious resources. Further, given a context abstracts the specific details of a presence platform, a client application or enabler is less brittle and significantly more resistant to underlying changes in the model or semantics of the presence platform.

As will be appreciated, FIGS. 3, 4, 5 and 6 described above are provided with reference to a P/CAM. However, example systems and methods herein could equally be applicable with a location platform and a L/CAM or a generic platform and an x/CAM. Further, a combination of these platforms is possible. The P/CAM, L/CAM, X/CAM or combination form the context aware layer.

Figure 7:
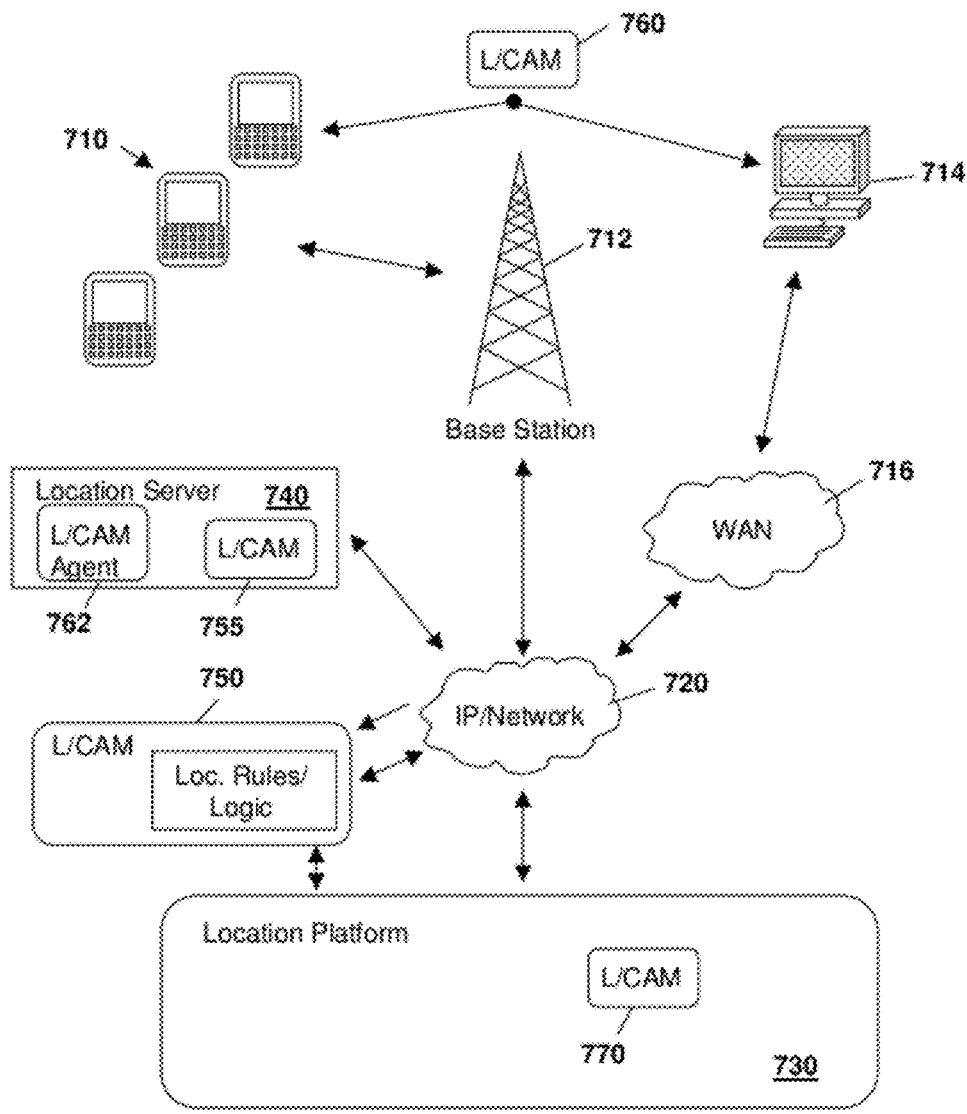
FIG. 7 is a block diagram showing an example location system in which a location context aware mechanism has been added.

With reference to FIG. 7, user devices 710 communicate through a base station 712 with a network 720. Further, a desktop 714 can communicate through a wide area network 716 with network 720. A location platform 730 is adapted to provide and store raw data regarding the location of user devices 710 and further to receive updates from user devices 710 and store this information.

A location server 740 is further adapted to communicate with a network 720 and can provide the location of various clients.

An L/CAM 750 could be a stand alone server communicating with a network 720 and with location platform 730. In an alternative embodiment the L/CAM server can be co-located on the location server as illustrated by reference numeral 755. In further embodiments, L/CAM agents can be located on devices such as agent 760 on user devices 710 or on the location server such as agent 762. In the case that agents 760 and 762 are used, various functionalities or all of the functionality of the L/CAM can be distributed to the user devices or the location server.

In further embodiments, the L/CAM can be part of the location platform 730, as shown by L/CAM 770.

Figure 8:
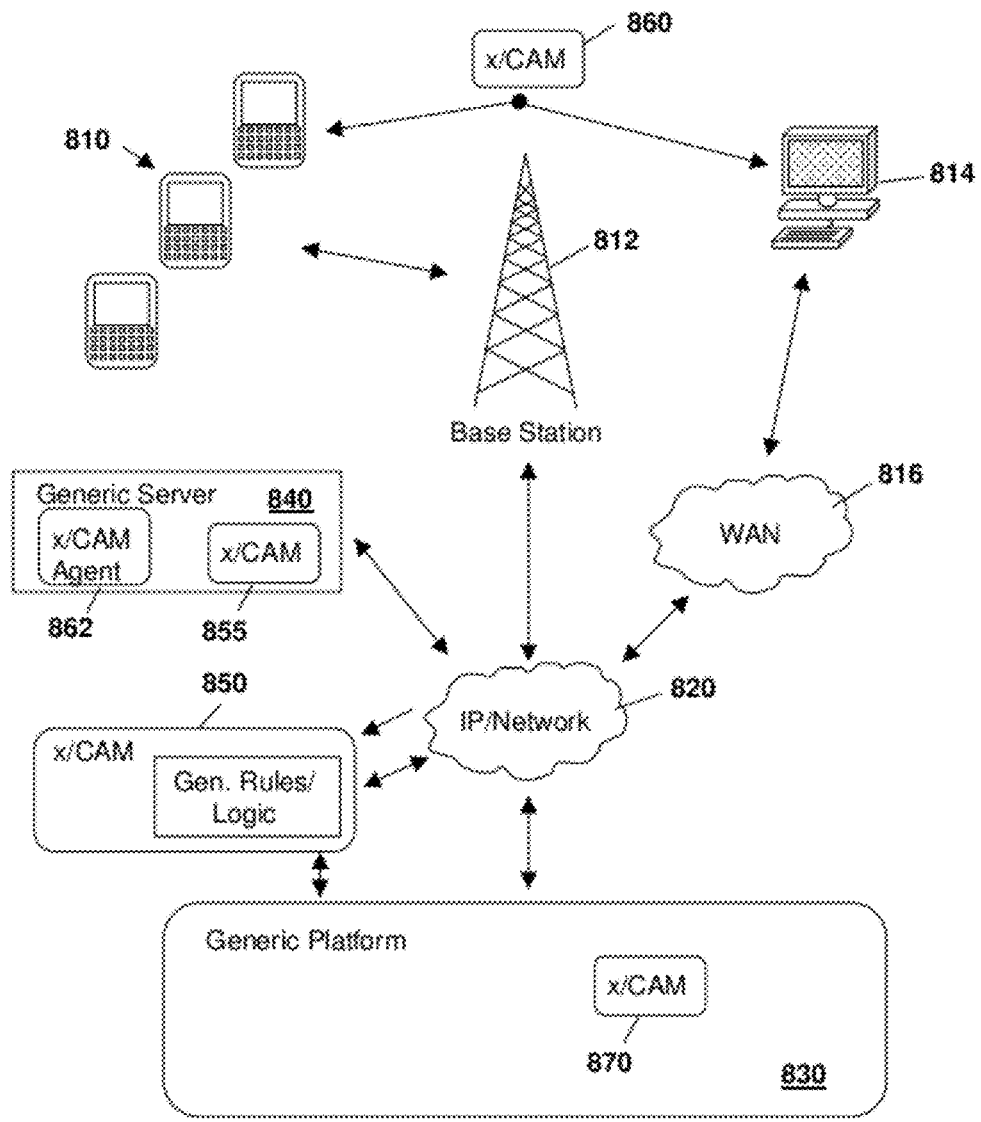
FIG. 8 is a block diagram showing an example generic system in which a generic context aware mechanism has been added.

Referring to FIG. 8, a generic environment is provided. In FIG. 8, user devices 810 communicate through a base station 812 with a network 820. Further, a desktop 814 (e.g., a computing device that is similar or different than user devices 810) communicates through a wide area network 816 with network 820. Also, a generic platform 830 is adapted to store data and states for various devices. Other servers such as a generic server 840 can exist within the network and can communicate over network 820.

Further, a generic x/CAM 850 is adapted to communicate with network 820 and with generic platform 830. In other embodiments, the x/CAM can be located on server 840 and this is shown as x/CAM 855.

In yet further embodiments, the x/CAM can have agents 860 or 862 that are located on user devices 810 or on server 840 respectively.

In further embodiments, the x/CAM can be part of the generic platform 830, as shown by x/CAM 870.

FIG. 8 illustrates how a platform, whether it be presence, location, generic or a combination of the previous may be abstracted to a context aware layer using context aware mechanisms or layers to support a multiplicity of application types or enablers.

The above may be implemented utilizing policies and rules/triggers. A process relating to this mechanism is provided below.

In accordance with one embodiment, a context or mechanism, whether it is presence, location or generic, may include one or more of policies, aspects, rules and triggers. Each is described in detail below. The description below has been presented with reference to a presence context or mechanism. This is, however, not meant to be limiting and those skilled in the art would appreciate that the below could be equally applicable to location or generic context or mechanisms.

Policy:

Policy is associated with a particular presence context at an appropriate point in the application life cycle, to specify the behavior or treatment of presence, location or generic related aspects. Policies augment rules/logic flows in terms of how they operate, to provide a more accurate and meaningful computation of aspects on behalf of a client application or enabler. As will be appreciated, a policy can apply to a class of applications, an individual application or even to a user and can be provisioned with settings on how aspects are computed.

Policy may be expressed using the Open Mobile Alliance's (OMA) policy evaluation, enforcement and management (PEEM)/policy expression language (PEL). PEL defines a generic and extensible grammar in which policies may be expressed using a rule set language. PEL is based on Internet Engineering Task Force (IETF) request for comments (rfc) 4745. Conditions and/or actions (as specified in rfc 4745) may be enhanced within the scope of PEEM, through the OMA XDM (XML Document Management) common policy extensions, as detailed in OMA-SUP-XSD_XSD_xdm-extensions-V1_0. The policy can also be expressed on IETF rfc 4745.

As will be appreciated, PEEM is a continuing standards effort by the OMA to define common functions needed by its enablers.

As an example, the following table describes relevant presence policies for use by a presence context in the computation of presence aspects. These policies have applicability to the OMA presence platform. However, given policies may be added or removed from the given context as required and the concept is applicable to a multiplicity of presence platforms. In the table below, the default value, if applicable, is shown in italics.

TABLE 1

Presence Policies

| Policy | Description | Values |
| --- | --- | --- |
| opt-in-source | Indicate which pres. element is an indicator of service opt-in. Default value indicates opt-in not relevant for the given comm. service. | willing \| *ignore* |
| applicable-network-type | Indicate the applicable network type(s) for the given comm. service. | *IMS*, SIP, <token>,... |
| threshold-value-equals | Establish an equality comparison operation threshold named label, with qn-elem, and value. A boolean value of 'true' or '1' or 'yes' would apply if the policy was applied to the xml-ns and the resulting target matched value. | <label> <qn-elem> <value> |
| threshold-value-less-than | Identical to equality, with the exception that the comparison operator is less than (<). | <label> <qn-elem> <value> |
| threshold-value-greater-than | Identical to equality, with the exception that the comparison operator is greater than (>). | <label> <qn-elem> <value> |
| unavailable-activies-set | Indicate the subset of activities from the watcher perspective that would render a contact unavailable. This set may be defined as empty which is an indication that activities has no bearing on availability. | busy, holiday, meal, in-transit, permanent-absence, sleeping, *unknown*, worship |
| undef-servcaps-sub-elements | Indicate how to interpret the absence or omission of specific <servcaps> sub-elements in presence metadata. | *unknown* \| unsupported |
| undef-barring-state | Indicate how to interpret the absence or omission of <barring-state> sub-elements in presence metadata. | *ignore* \| active \| terminated |
| undef-registration-state | Indicate how to interpret the absence or omission of <registration-state> sub-element in presence metadata. | *ignore* \| active \| terminated |
| undef-willingness | Indicate how to interpret the absence or omission of <willingness> for the given comm. service. | (open,indefinite) \| *(closed,indefinite)* \| (open, time-ofs-value) \| (closed,time-ofs-value) |

Table 1 above defines various policies and values for the policies. As indicated in the table, various policies exist and the description of the policy and the values are provided.

In the first row of the table, a first policy is "opt-in-source". The policy is used to indicate which presence element is an indicator of service opt-in. The default value indicates that opt-in is not relevant for the given communication service.

The values that are possible for the opt-in-source policy are willing, or ignore. As will be appreciated, these could be selected by various entities such as the service provider, among others. The entity choosing the policy can choose which values to utilize. Thus, for example, the service provider could choose to ignore opt-in source for the first policy.

The second policy described in Table 1 is applicable-network-type and indicates the applicable network types for a given communication service. A default, as shown, is IMS. However, other values include session initiation protocol (SIP) or a token and can be chosen by the selecting entity.

The third policy is "threshold-value-equals" and could be utilized to establish an equality comparison operation threshold named label with a qualified name XML element and value. A boolean value of one or true or yes would apply if the policy was applied in the XML name space and the resulting target matched the value.

The next policy in Table 1 is "threshold-value-less-than". This is similar to the threshold-value-equals policy except that it utilizes the less-than comparator.

Similarly, the next policy is "threshold-value-greater-than" which is similar to the above-mentioned threshold-value policies, except with the greater-than operator.

The next policy is "unavailable-activities-set" and could include a subset of activities that would render the contact unavailable in the context of the application, service or enabler. In the default setting this is unknown, but it could include things like busy, holiday, meal, among others.

The next policy is "undef-servcaps-sub-elements" and indicates undefined service capabilities and how the application is to interpret these. For example, Table 1 indicates that if the service capability is undefined it could be considered to be unsupported.

The next policy in Table 1 is "un-def-barring-state" and indicates how to interpret the absence or omission of a barring-state XML element in presence metadata and could include that the state is active or terminated. The default is that the state will be ignored.

Similarly, an "undef-registration-state" indicates how to interpret the absence or omission of a registration-state XML element and is by default ignored but could also be active and terminated in the example of Table 1 above.

The final policy defined in Table 1 above is "undef-willingness" and indicates how to interpret the absence or omission of a willingness XML element for a given communications service and could include a pair consisting of a state (open, or closed) along with a validity period (either an indefinite period or a preset validity period).

As will be appreciated by those skilled in the art, Table 1 above is merely meant as an example and other policies are possible based on the needs of a system or user.

To support the policies in the preceding table, the P/CAM requires additional XML types and element definitions in order to extend the PEL common-policy "actions". The following XML schema document provides further details relating to how these actions may be extended for use by a P/CAM.

```xml
<?xml version="1.0" encoding="UTF-8"?>
<xs:schema
 targetNamespace="urn:oma:xml:xdm:extensions:cam"
 xmlns="urn:oma:xml:xdm:extensions:cam"
 xmlns:xs="http://www.w3.org/2001/XMLSchema"
 elementFormDefault="qualified" attributeFormDefault="unqualified">
<!-- This import brings in the XML language attribute xml:lang -->
<xs:import namespace="http://www.w3.org/XML/1998/namespace"
 schemaLocation="http://www.w3.org/2001/xml.xsd"/>
 <!- P/CAM specific "actions" child element extensions to -->
 <!- namespace urn:ietf:params:xml:ns:common-policy -->
<xs:element name="opt-in-source" type="OptInSourceType"/>
<xs:element name="applicable-network-type"
type="ApplicableNetworkType"/>
<xs:element name="threshold-value-equals" type="ThresholdEqType"/>
<xs:element name="threshold-value-less-than"
type="ThresholdLtType"/>
<xs:element name="threshold-value-greater-than"
type="ThresholdGtType"/>
<xs:element name="unavailable-activities-set"
type="UnavailActivityType"/>
 <xs:element name="undef-servcaps-sub-elements"
    type="UndefServCapsSubElemsType"/>
<xs:element name="undef-barring-state"
type="UndefBarringStateType"/>
 <xs:element name="undef-registration-state"
    type="UndefRegistrationStateType"/>
<xs:element name="undef-willingness" type="UndefWillingnessType"/>
<!-- Type definitions defined by this document-->
<!-- OptInSource indicator -->
<xs:simpleType name="OptInSourceType">
    <xs:annotation>
        <xs:documentation>
        Policy: opt-in-source
        The associated service(s) use 'willing', or 'ignore' as opt-in
        indicator.
        The default is 'ignore' which means no opt-in indicator is relevant.
        </xs:documentation>
    </xs:annotation>
    <xs:restriction base="xs:token">
        <xs:pattern value="willing|ignore"/>
    </xs:restriction>
</xs:simpleType>
<!-- NetType -->
<xs:simpleType name="NetType">
 <xs:restriction base="xs:string">
    <xs:pattern value="IMS|SIP|[a-zA-Z][a-zA-Z0-9][a-zA-Z0-9]+"/>
 </xs:restriction>
</xs:simpleType>
<!-- ApplicableNetworkType indicator -->
<xs:simpleType name="ApplicableNetworkType">
    <xs:annotation>
        <xs:documentation>
        Policy: applicable-network-type
        Indicator of applicable network type(s) for the given
      communication service.
        </xs:documentation>
    </xs:annotation>
 <xs:list itemType="NetType"/>
</xs:simpleType>
<!-- Threshold indicator types -->
<xs:complexType name="BaseThresholdType" abstract="true">
 <xs:annotation>
    <xs:documentation>
    Base type definition for threshold types.  Specifies 'label' which
    is used to identify the specific threshold, along with the qualified
    name.
  </xs:documentation>
 </xs:annotation>
 <xs:all>
    <xs:element name="label"   type="xs:token"/>
    <xs:element name="qn-elem" type="xs:QName"/>
    <xs:element name="value" type="xs:anyType"/>
 </xs:all>
</xs:complexType>
<xs:complexType name="ThresholdEqType">
 <xs:annotation>
    <xs:documentation>
    Policy: threshold-value-equals
    Comparison operation (equality) threshold for 'label' for
    qualified
    element name 'qn-elem' with value specified as 'value'.
    </xs:documentation>
 </xs:annotation>
 <xs:complexContent>
        <xs:extension base="BaseThresholdType"/>
 </xs:complexContent>
</xs:complexType>
<xs:complexType name="ThresholdLtType">
 <xs:annotation>
    <xs:documentation>
    Policy: threshold-value-less-than
    Comparison operation (less-than) threshold for 'label' for
    qualified element name 'qn-elem' with value specified as 'value'.
    </xs:documentation>
 </xs:annotation>
 <xs:complexContent>
        <xs:extension base="BaseThresholdType"/>
 </xs:complexContent>
</xs:complexType>
<xs:complexType name="ThresholdGtType">
 <xs:annotation>
    <xs:documentation>
    Policy: threshold-value-greater-than
    Comparison operation (greater-than) threshold for 'label' for
    qualified element name 'qn-elem' with value specified as 'value'.
    </xs:documentation>
 </xs:annotation>
 <xs:complexContent>
        <xs:extension base="BaseThresholdType"/>
 </xs:complexContent>
</xs:complexType>
<!-- Unavailable activities indicator -->
<xs:simpleType name="UnavailActivityType">
 <xs:annotation>
    <xs:documentation>
    Policy: unavailable-activities-set
    Used to describe all activities related to an application or enabler
    that would render an individual unavailable.
    </xs:documentation>
 </xs:annotation>
<xs:list itemType="xs:QName"/>
```

-continued

```
</xs:simpleType>
<!-- UndefServCapsSubElems indicator -->
<xs:simpleType name="UndefServCapsSubElemsType">
  <xs:annotation>
    <xs:documentation>
    Policy: undef-servcaps-sub-elements
    Indicate how to interpret the absence or omission of specific
       <servcaps> sub-elements in presence metadata. Value of
       'unknown' is considered the default which does not give the
    context any hints as to how to deal with missing/absent
    <servcaps> sub-elements.
    </xs:documentation>
  </xs:annotation>
  <xs:restriction base="xs:token">
    <xs:pattern value="unknown|unsupported"/>
  </xs:restriction>
</xs:simpleType>
<!-- UndefBarringState indicator -->
<xs:simpleType name="UndefBarringStateType">
    <xs:annotation>
     <xs:documentation>
      Policy: undef-barring-state
      Indicate how to interpret the absence or omission of specific
        <barring-state> sub-elements in presence metadata.
        </xs:documentation>
      </xs:annotation>
      <xs:restriction base="xs:token">
            <xs:pattern value="ignore|active|terminated"/>
      </xs:restriction>
</xs:simpleType>
<!-- UndefRegistrationState indicator -->
<xs:simpleType name="UndefRegistrationStateType">
    <xs:annotation>
      <xs:documentation>
      Policy: undef-registration-state
      Indicate how to interpret the absence or omission of specific
        <registration-state> sub-elements in presence metadata.
      Default value of 'ignore' indicates that the sub-element has
      no meaning in this context.
        </xs:documentation>
      </xs:annotation>
   <xs:restriction base="xs:token">
        <xs:pattern value="ignore|active|terminated"/>
   </xs:restriction>
</xs:simpleType>
<!-- UndefWillingnessType indicator -->
<xs:simpleType name="UndefWillingnessType">
    <xs:annotation>
      <xs:documentation>
      Policy: undef-willingness
      Indicator of how to interpret absence or omission of
      <willingness> sub-element for the given service.
      Default value is 'closed/indefinite'.
        </xs:documentation>
      </xs:annotation>
   <xs:restriction base="xs:token">
         <xs:enumeration value="open/indefinite"/>
         <xs:enumeration value="closed/indefinite"/>
         <xs:enumeration value="open/time-ofs-value"/>
         <xs:enumeration value="closed/time-ofs-value"/>
   </xs:restriction>
</xs:simpleType>
</xs:schema>
```

The above XML schema provides for the definition of element name in the lines that begin <xs:element name="opt-in-source" type="OptinSourceType"/>. The element names are further defined for the remaining policies in Table 1 above.

As will be seen by those skilled in the art, the remainder of the XML Schema above defines the policy types as indicated by the description and value fields in Table 1. Specifically, for the "OptinSourceType" a xs:pattern value is set to willing or ignore. The above therefore provides the additional XML type and element definitions in order to extend PEL common policy actions.

By extending common policy actions, P/CAM policies may be incorporated into a common policy PEL 'ruleset' XML document. A 'ruleset' may apply at a user scope or a global scope. For example, the 'ruleset' may apply to a class of service or a specific application. The ruleset may also apply to an individual user or group of users.

P/CAM related policies are manipulated and evaluated through the various PEEM requester interfaces by the P/CAM server itself or a P/CAM enabled client/agent. That is, application or authentication protocols may provide specific metadata such as the requester identity to the PEEM requester interface along with other metadata available to the PEEM servers as the basis for applying rules.

The following is an example of a common policy PEL rule set XML document, which consists of a single rule 'a101'. This rule associates with a service enabler such as a PoC alert and defines specific policy settings/values be applied as a result of a match for a target resource. In this case the target resource is the service identifier itself. As will be appreciated by those skilled in the art, this example makes an intentional correlation between the value of the common policy extension 'ext:service[@enabler]' attribute and the OMA PoC alert service-id as defined by OMA presence.

Figure 12:
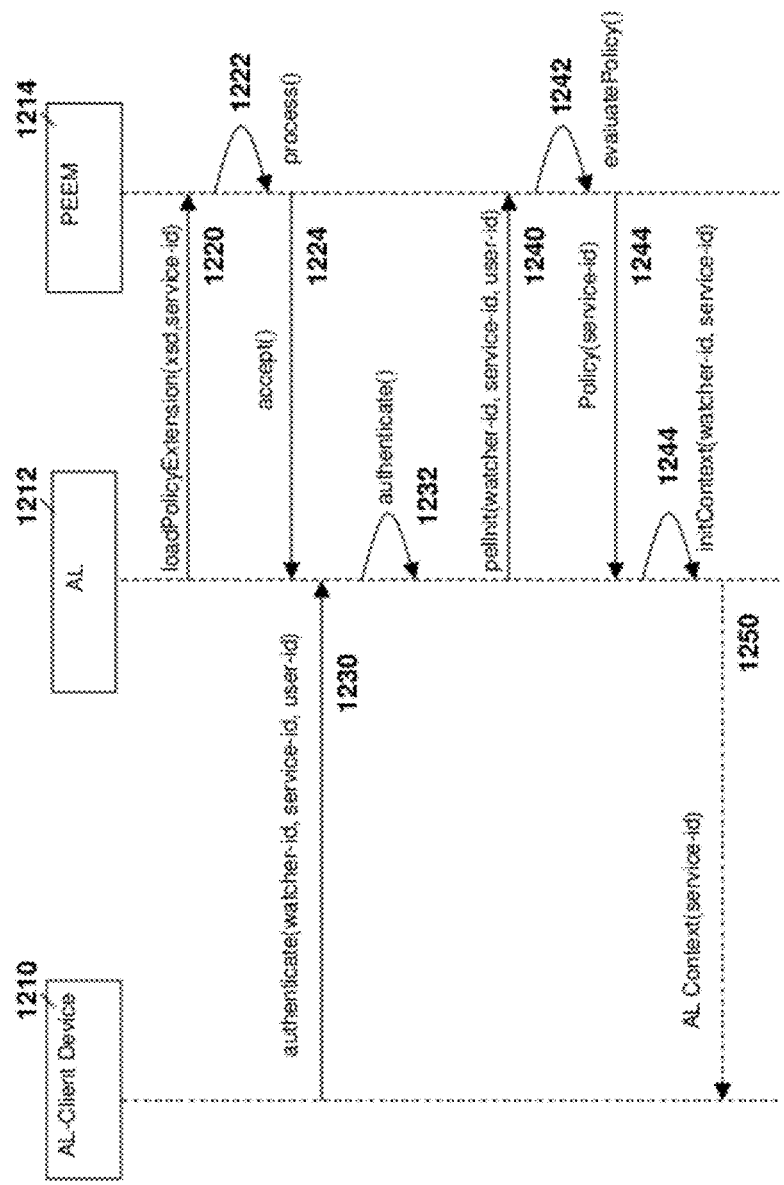
FIG. 12 is an example call flow diagram showing call flow for policy setup.

The above is illustrated with reference to FIG. 12, which shows how a aware layer (AL) such as a context aware layer (CAL), for example, can preload a given set of policy-type XSD. As will be appreciated, these are types as shown by Table 1 above.

An AL-client device 1210 communicates with a AL 1212, which communicates with a PEEM 1214.

AL 1212 sends a loadPolicyExtension(xsd,service-id) message 1220 to PEEM 1214 which is processed, as shown by arrow 1222. PEEM 1214 then sends an accept message 1224 to AL 1212.

At some later point the AL-enabled client device 1210 attempts to initiate and authenticate with a AL 1212 service enabler such as a PoC alert service. This is done with the authenticate (watcher-id, service-id, user-id) message 1230.

As part of the initiation and authentication the AL 1212 sends a pellnit (watcher-id, service-id, user-id) message 1240 to PEEM 1214. PEEM 1214 evaluates the policy as shown by arrow 1242 and returns the policy in message 1244. Evaluation 1242 allows the PEEM to apply a specific set of policy settings on a per server or per user basis.

AL 1212 initiates the context arrow 1244 and further optionally returns the AL context as message 1250 back to AL client device 1210.

It is possible that, as an example, the match criteria could be the service-id relating to an OMA enabler (such as PoC alert). Other match criteria could be based on a user or a group sphere.

```
<?xml version="1.0" encoding="UTF-8"?>
<!-- Sample policy ruleset for OMA PoC Alert service. -->
<!- A ruleset may apply on a per-user or global basis. -->
<cr:ruleset  xmlns="urn:ietf:params:xml:ns:common-policy"
    xmlns:ext="urn:oma:xml:xdm:extensions"
    xmlns:cr="urn:ietf:params:xml:ns:common-policy"
       xmlns:cs="urn:oma:xml:xdm:extensions:cam"
    xmlns:rpid="urn:ietf:params:xml:ns:pidf:rpid">
  <!-- A rule for PoC alert service, establish context policies -->
      <cr:rule id="a101">
         <cr:conditions>
            <ext:service-list>
            <!--Match against a specific OMA enabler by service-ID... -->
               <ext:service
               enabler="org.openmobilealliance.PoC-alert"/>
            </ext:service-list>
         </cr:conditions>
```

-continued

```
    <cr:actions>
    <!-- Following policy values for document scope... -->
        <cs:undef-servcaps-sub-elements>
            unsupported
        </cs:undef-servcaps-sub-elements>
        <cs:undef-willingness>
            closed/indefinite
        </cs:undef-willingness>
        <cs:opt-in-source>willing</cs:opt-in-source>
        <cs:unavailable-activities-set>
            rpid:busy rpid:sleeping
        </cs:unavailable-activities-set>
        <cs:undef-registration-state>
            terminated
        </cs:undef-registration-state>
        <cs:undef-barring-state>
            ignore
        </cs:undef-barring-state>
        <cs:applicable-network-type>
            IMS
        </cs:applicable-network-type>
    </cr:actions>
    </cr:rule>
</ruleset>
```

As will be appreciated by those skilled in the art, the above defines rule 'a101'. In this case the service-id is defined as "org.openmobilealliance.PoC-alert" the OMA PoC Alert service, and the P/CAM policy extensions are defined as part of the XML namespace "urn:oma:xml:xdm:extensions:cam". The above is therefore a manifestation of the schema defined with regard to Table 1 above. The context aware layer values based on rule 'a101' firing are shown below with reference to Table 1A.

TABLE 1A

| Policy Setting/Values (OMA PoC Alert Service) | |
|---|---|
| Policy | Value |
| opt-in-source | willing |
| applicable-network-type | *IMS* |
| unavailable-activies-set | rpid:busy rpid:sleeping |
| undef-servcaps-sub-elements | unsupported |
| undef-barring-state | *ignore* |
| undef-registration-state | terminated |
| undef-willingness | *(closed,indefinite)* |

As will be appreciated, the PEEM could utilize multiple application policies and multiple services or exclusions could be established as part of a ruleset.

The actions as seen in the XML above define specific policy values for document scope.

Aspects:

Aspects are application level abstractions relevant to a source, for example, presence aspects are application level abstractions relevant to presence. Presence aspects can be considered the conceptual interface of a presence context to a P/CAM client application or enabler. Table 2 below outlines a base set of applicable presence aspects that may be incorporated for use by a presence context aware mechanism and exposed to client applications. For each presence aspect, a description is provided, along with the associations the aspect relates to in terms of the standard presence data model outlined in IETF rfc 4479.

In particular, to specify and apply contextually relevant behavior across a disparate set of interworking components and user devices, a general mechanism is required for the encapsulation of aspects related to a presence platform. That is, an aspect captures a first-order abstraction related to a given application or enabler. Aspects relating to a presence platform would describe or relate to underlying indications of presence. Aspects may be expanded to encapsulate other indications as well. For example, location may be incorporated (or inferred) to derive or compute an associated aspect within a presence platform. This is illustrated in Table 2 below with regard to the who-is-nearby aspect.

The present disclosure provides a mechanism for an arbitrary number of aspects as required by the presence platform. These may include common aspects such as availability and reachability. They may also include application specific aspects. A mechanism within the presence platform or management interface exists to associate an appropriate set of aspects with a given service. Association of aspects of contextual in nature and may apply at different levels. For example, a given aspect may apply to a service enabler such as all OMA push-to-talk over cellular (i.e. PoC) compliant service.

An aspect may also be applicable at a user or group level.

For each aspect, an associated set of rules or logic may be defined which outline the steps or processing required to achieve the given aspect. The logic also identifies the raw presence/data indicators/elements relevant to the calculation of the associated aspect. A given aspect may combine two or more predefined rules together as part of its logic processing. Further, underlying logic may be reused as a library or routines in support of aspects within a presence platform. This library may include aspects as other high-level modules or components which may be incorporated. This allows multiple client application types to utilize a context aware layer.

In one embodiment presence aspects are extensible. For example, if a given service or enabler requires specific functionality, the presence platform could support the extension or re-definition in one or more aspects, as required.

As will be appreciated by those skilled in the art, Table 2 may be modified or extended to support other presence platforms or application/enabler requirements. The particular presence aspects shown in Table 2 are demonstrative of an OMA presence platform.

TABLE 2

| Presence Aspects | | | | |
|---|---|---|---|---|
| Presence Aspect | Description | Associations | Visibility | Common visibility |
| opt-in | Presentity is willing to participate in a session for a given service or application. | Person –> service. | OTA, Server | Server |
| Available | Presentity is available to communicate using a given service or application. | Person –> service. | OTA, Server | Server |

TABLE 2-continued

Presence Aspects

| Presence Aspect | Description | Associations | Visibility | Common visibility |
|---|---|---|---|---|
| contact-means | Presentities most applicable method of contact for a given service or application. | Person(addr) -> service. | OTA, server | Server |
| contactable | Presentity is willing, available, and has a currently valid contact means for a given service or application. | Person(addr) -> service. | OTA, server | Server |
| reachable | Presentity is contactable for a given Service or application. | Person -> service -> device | OTA, server | OTA |
| where-are-you | Presentities current location. | Person, Person -> service -> device | OTA, server | OTA |
| personal-avatar | Presentities current personal iconic representation. | Person | OTA, server | OTA |
| service-avatar | Presentities current iconic representation for a given service or application. | Person -> service | OTA, server | OTA |
| personal-interests | Presentities current interests or hobbies. | Person(extended-info) | OTA, server | Server |
| who-is-subscribing-to-me | Watchers that currently have 'pending' subscriptions for a given presentity. | Winfo | OTA, server | Server |
| who-is-nearby | A list of zero or more presentities that are within close proximity and meet an optional set of criteria (e.g. interested in football). | Person -> service | OTA, server | Either |
| who-is-blocked | Watchers who have had subscriptions terminated or have been blocked for a given presentity | Winfo, common-policy | OTA, server | Server |
| eligible-session-participant | Whether a presentity is reachable and meets an optional set of criteria in order to participate in a session of the associated service. | Person -> service -> device, Shared UserProfile, Other XDMS meta-data | OTA, Server | Server |
| Session-answermode | An indicator of whether a presentity will accept an incoming session for a given service in automatic (no intervention) or manual (user must accept/reject) mode. | Person -> service | OTA, Server | OTA |

NOTE:
A positive indication for reachable indicates that a presentity is willing, available, contactable, and their device is in-coverage to establish communication over the defined service.

Table 2 defines various presence/application/service aspects applicable to a presence platform. For each aspect there is a short description along with the association or applicability of the aspect to the standard presence data model. In addition, the visibility is declared. Visibility describes the applicable point at which the associate aspect is referred to. Common visibility defines or declares the most common or relevant point at which the associated aspect is likely to be referred. Choices for visibility include over the air (OTA) versus server. As would be appreciated, "server" would surface on the network side in an application server.

In the first row of Table 2 above, the opt-in aspect is defined which indicates that the presentity is willing to participate in a given session for a given service or application. As indicated in Table 2, the person is associated with the service.

A second row of Table 2 indicates that a presence aspect is 'available'. This aspect indicates that the presentity is available to communicate using a given service or application and again there is an association between the person and the service.

The next row in Table 2 indicates the presence aspect of contact-means. A presentity's most applicable method of contact for a given service or application is provided and the association is between the person's address and the service.

The next row of Table 2 indicates an aspect of 'contactable'. This aspect shows whether the presentity is willing, available and has currently valid contact means for a given service or application. Again, in this case, the association is between the address of a person and the service.

The next row of the table indicates an aspect of 'reachable'. This shows that the presentity is contactable for a given service or application. A positive indication for reachable shows that a presentity is willing, available, contactable and that their device is in coverage to establish communication over the defined service. The association is therefore between the person, service and the device.

'Where-are-you' is the next aspect defined in Table 2 and shows the presentity's current location. As indicated, the association for this aspect is at the person, and the person, service, and the device.

Other aspects are further defined in Table 2 and include various associations thereto.

Figure 13:
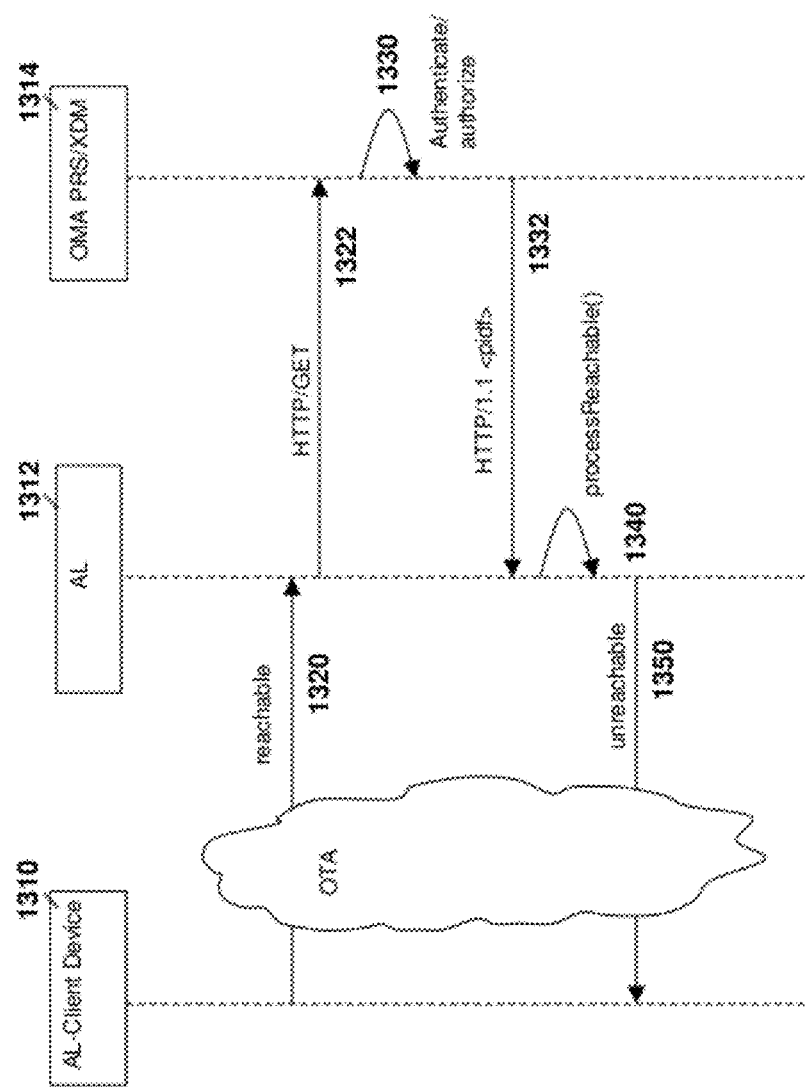
FIG. 13 is an example call flow diagram showing call flow for aspects within an OMA/PRS environment.

For an OMA presence realization, an example presence platform call flow may look like that shown in FIG. 13. Those skilled in the art will appreciate that FIG. 13 shows that the context aware layer may be configured between a client device and the OMA presence/XDM layer. In one embodiment, the access layer can be an application layer or proxy. Such a context aware layer could be a separate layer or an internal layer of the application (for example a mobile advertising application with a split or integrated context aware layer).

As shown in FIG. 13, the aspect "reachable" may include, in the back end, further processing which incorporates rules and possibly the use of other aspects in the computation. As previously noted, these aspects may exist within a standard library of aspects for reuse within higher level applications or service aspects when required.

Reference is now made to FIG. 13. FIG. 13 shows a client device 1310 which communicates with an access layer (AL) 1312 (e.g., a context aware layer (CAL)), which in turn communicates with an OMA PRS/XDM entity 1314.

Client device 1310 sends a query concerning the presence aspect "reachable", shown as communication 1320. In turn, access layer (AL) 1312 sends an HTTP/GET request 1322 to OMA PRS/XDM 1314.

OMA PRS/XDM 1314 authenticates as shown by 1330 and returns a response in the form of HTTP/1.1<pidf> 1332.

The access layer (AL) 1312 then checks whether the process is reachable as shown by arrow 1340. The processing within the AL for the aspect "reachable" invokes other rules such as "contactable", "contact-means", "available" and "opt-in or willing".

The arrow shown by 1340 determines that the presentity is unreachable and returns this in message 1350.

As shown in FIG. 13 reachable query 1320 and unreachable response 1350 travel over the air. However, this is meant only as an example and other communications techniques would be applicable in different embodiments.

Rules/Triggers:

A third branch of the context awareness mechanism solution consists of rules and/or triggers. The example below uses presence as an example.

Rules reside within a presence context and establish a sequence of steps or logic flows required to compute presence aspects based on the metadata provided by the underlying presence platform. Rules are conceptually similar to database stored procedures or user defined functions (UDFs). Base or default presence rules may be changed or supplemented by an application client or an individual user. For example, the injection by a client of dynamic rules may override or extend base rule behavior. In addition, rules incorporate policies associated with the presence context by the application or the enabler to augment or provide hints surrounding the interpretation of metadata. This permits an application or service to directly affect the outcome of one or more presence aspects, as required.

Table 3 below shows a set of rules relating to computation of presence related aspects with pseudo-logic specific to the OMA presence platform. It should be noted that this is only a subset of the rules/logic that may be exposed by a presence context. It is possible to change the composition or granularity of rules as required by the presence context. In addition, as noted with reference to FIGS. 3-6 above, it is possible for a presentity or watcher to continue to fetch or be notified of raw presence information by the underlying presence platform in order to reach specific conclusions if context is not applicable. This could, as would be appreciated, occur in specific situations.

As used in Table 3 below, 'def' indicates "defined" and means that the entity exists and is established with reasonable values, whereas 'undef' means "undefined"—the complement of 'def'. 'Undef' thus has values such as nil, null, or invalid.

'Valid' in Table 3 below means the associated entity still contains timely or meaningful data.

TABLE 3

| Rules | | |
|---|---|---|
| Rule | Description | Pseudo-logic |
| findServicePresInfo | Return most applicable pres. information element 'svc' for the given service or application within service 'list'. NOTE: pseudo-logic method 'resolveService( )' implements semantics outlined in OMA-TS-Pres V2_0 Section (5.2.3). | For each <tuple> 't' in list with t.service-id == service-id     Items.add('t') If Items.size == 1     Res=Items[0] Else     Res=resolveService(Items) Return Res |
| hasOptedInForService | Makes use of opt-in-source policy to establish a user 'p' willingness to communicate given a service or application 'svc'. Willingness is an ordered pair (open\|closed, indefinite\|time-ofs-value). NOTE: pseudo-logic method implements semantics outlined | Switch (opt-in-source policy) Case willing:     Uwp=undef-willingness policy     If svc.willingness undef         Return Uwp     Else         Return svc.willingness Case session-participation: |

TABLE 3-continued

| Rule | Description | Pseudo-logic |
|---|---|---|
| | in OMA-TS-Pres V2_0 Section (10.4.1). | Return Willingness(svc.session-participation, indefinite)<br>Default: // ignore<br>    Return Willingness(open, indefinite) |
| isAvailable | Return boolean value indicating whether a presentity 'p' is available to communicate for a given Service or applicaiton 'svc'.<br>NOTE: pseudo-logic method implements semantics outlined in OMA-TS-Pres V2_0 Section (10.4.3). The logic in this method also factors in activity (if directed to by policy) into availability calculation. | Urs=undef-registration-state policy<br>Ubs=undef-barring-state policy<br>Uas=unavailable-activities-set policy<br>If (p.activities valid and <activities> non-empty-set)<br>    For each <activities> 'a' in p:<br>        If ('a' match 1+ element in Uas)<br>            Return false<br>If (svc.reg-state undef)<br>    If (Urs == 'ignore')<br>        Reg-state=active<br>    Else<br>        Reg-state=Urs<br>Else<br>    Reg-state=svc.reg-state<br>If (svc.bar-state undef)<br>    If (Ubs == 'ignore')<br>        Bar-state=active<br>    Else<br>        Bar-state=Ubs<br>Else<br>    Bar-state=svc.bar-state<br>If (Reg-State == 'active' AND Bar-state == 'active' AND svc.status.basic == 'open')<br>    Return true<br>Return false |
| establishContactMeans | Return applicable contact 'c' for a given a service or application service 'svc'.<br>NOTE: pseudo-logic follows rfc 3863. | Return svc.contact |
| isContactable | Return a valid ContactMeans consisting of the tuple (contact,Idev,validity) if a presentity 'p' is contactable for a given service or applicaiton 'svc'.<br>NOTE: pseudo-logic method implements semantics outlined in OMA-TS-Pres V2_0 Section (10.4). | W = hasOptedInForService(p,svc)<br>If (W valid AND isAvailable(p,svc))<br>    C = establishContactMeans(svc)<br>    If (C def AND svc.deviceID def)<br>        Cm=ContactMeans(<br>        Contact, svc.deviceID(s),<br>        w.validity)<br>        Return Cm |
| isReachable | Return boolean value indicating whether an applicable device 'dev' may be reached over the required network type given a contactable contact-means. | Ant=applicable-network-type policy<br>If (cm valid)<br>    For each 'd->deviceID' in Idev:<br>        Find 'dev' in <device> elements where dev.deviceID == 'd->deviceID'<br>        If match<br>            For each <network> 'n' in 'dev':<br>                If ('n'.id match 1+ element in Ant and 'n' available)<br>                     Return true<br>Return false |

Table 3 above describes a number of rules. The first rule defined is 'findServicePresinfo' which returns the most applicable presence information element for the given service or application within a service list. As indicated in the pseudo logic, for each tuple t in the list, a check is made to see whether the service-id of 't' matches the desired service-id, and if so the tuple t is added to a list. Thereafter, once the compilation is finished, if the item size is 1 then that item is returned. Otherwise the function 'resolveService' is invoked. As will be appreciated by those skilled in the art, the 'resolveService' function is an OMA specific function that finds the most relevant service.

Similar rules are defined with regard to the remainder to the Table 3, in which various pseudo logics are utilized to define what will be returned when a rule is implemented.

Presence rules and/or logic flows may be specified using OMA's PEEM/PEL. The following is an example of a PEEM/PEL 'abstract process' document which characterizes the logic flow for the 'findServicePresinfo' rule as shown in the pseudo-logic of Table 3 above:

```
<process name="findServicePresInfo"
    targetNamespace="http://example.com/ws-bp/purchase"
    xmlns="http://docs.oasis-open.org/wsbpel/2.0/process/abstract"
    xmlns:pcam="http://pcam.example.com/wsdl/oma-pres-pcam">
<documentation xml:lang="EN">
A WS-BPEL process for finding the appropriate service tuple(s).
</documentation>
<!-- Input/output parameters: -->
<!-- presinfo - inbound body containing service-ID, and presence info -->
<!-- theResult - the most relevant service tuple for service-ID -->
<variables>
  <variable name="presinfo" messageType="##opaque"/>
  <variable name="matchingTupleList" messageType="##opaque"/>
  <variable name="theResult" messageType="##opaque"/>
</variables>
<partnerLinks>
  <partnerLink name="service" partnerLinkType="##opaque"
    partnerRole="##opaque"/>
  <partnerLink name="customer" partnerLinkType="##opaque"
    partnerRole="##opaque"
    myRole="##opaque"/>
</partnerLinks>
<sequence>
  <receive partnerLink="customer"
  operation="findServicePresInfoRequest"
    variable="presinfo" createInstance="yes">
  </receive>
  <forEach counterName="i" parallel="no">
    <!-- Iterate over $presinfo.msg/tuple and find all matches -->
    <!-- between $presinfo.msg/service-id and           -->
    <!-- $presinfo.msg/tuple[i]/service-description/service-id -->
    <!-- Store in matchingTupleList                     -->
  </forEach>
  <if>
    <condition opaque="yes">$matchingTupleList.num-items == 1</condition>
    <flow>
      <!-- $theResult is the first item in $matchingTupleList -->
    </flow>
    <else>
      <!-- $theResult is the outcome of invoking resolveService -->
      <!-- method with $matchingTupleList -->
    </else>
  </if>
  <reply partnerLink="service" portType="##opaque"
    operation="##opaque" variable="theResult">
  </reply>
</sequence>
</process>
```

The other portion of the rules/triggers branch is triggers. Triggers reside within a presence context and associate a sequence of steps (or logic flows) based on an underlying presence state change detected in the presence platform. Triggers are conceptually similar to database triggers. Triggers are, by default, initially notifications. Triggers may be defined by an application client, or an individual user as needed. For example, the injection by a client of dynamic triggers may override or extend base trigger behavior(s).

Table 4 lists a set of triggers relating to the computation of presence related aspects with pseudo-logic specific to the particular trigger. It should be noted that aspects may also be defined with a corresponding trigger definition.

TABLE 4

Triggers

| Trigger | Description | Pseudo-logic |
|---|---|---|
| onOptIn/Out | Application defined trigger which is invoked when a presentity is determined to have opted-in/out for the given service or application | notification(default) |
| onUn/Available | Application defined trigger which is invoked when a presentity is un/available for the given service or application. | notification (default) |
| onUn/Reachable | An application defined trigger which is invoked when a presentity is un/reachable for the given service or application. | notification (default) |
| onNearby/onOutOfRange | Invoked when a presentity is nearby or they have moved out of a specified range for the given service or applicaiton. | notification (default) |
| on-pending-subscription | Invoked when a presentity has one or more subscriptions in a 'pending' state. | notification w/list<AOR> (default) |
| on-terminated-subscription | Invoked when a presentity has one or more subscriptions in a 'terminated' state. | notification w/list<AOR> (default) |
| on-update-note | When a presentity adds or updates a personal note. | notification w/note-text (default) |
| on-is-in/eligible-session-participant | When a presentity is un/reachable and in/eligible for the given service or application. | notification (default) |

The first trigger in Table 4 above indicates that the trigger will be invoked when a presentity opts in or out of a given service or application. The trigger allows specific functionality to be carried out when the associated state occurs within the context. The pseudo-logic can be defined by the application client if the client wishes the P/CAM to do something on the occurrence of a given event which is when a trigger is invoked.

The other triggers defined by Table 4 have similar functionality and are invoked pursuant to a predefined condition being met.

Triggers are specified using OMA's PEEM/PEL (Policy Expression Language) and are substantially similar (in structure and composition) to presence rules. Thus the code example used above with reference to rules could be adapted for the triggers of Table 4.

Triggers are useful in a complex presence-aware system. Triggers provide a network initiated encapsulation to be defined and applied for a given scenario. Triggers, in one embodiment, provide a simple notification to a client or service or may incorporate complex business logic that is executed completely within the network. This is helpful within a wireless domain where network bandwidth and processing resources are limited.

For example, a wireless content delivery service may require specific behavior based on the state of users and their associated device capabilities. That is, two users who have opted in for a sports ticker/alert service with different devices may receive content in different ways. For example, a first user who has a very simple text based wireless device and is only able to receive short message service (SMS) with baseball related content and/or a web-based URL pointing to additional information requires different data than a second user who has a full featured personal digital assistant/smart phone with a built in media handling capability. The second user may receive multimedia alert messages containing short full-color video clips of a sports 'play of the day'.

Each case above illustrates the underlying complexity of a content delivery service for delivering appropriate/timely content relevant to each user's device. That is, a content delivery service typically has some understanding of a given user's current state, along with their associated interests, and the relevant device capabilities for receiving content. A content delivery service working in combination with a contextually aware presence capability is such a platform. Further, a contextually aware platform that exposes relevant "aspect triggers" on behalf of a content delivery service provides useful means for notifying or pushing relevant information to an associated subscriber base.

An aspect with an associated trigger is a "monitored aspect" on a continuous or specified basis. That is, when an entity, whether a person or a logical entity, reaches or qualifies for an associated aspect trigger, the associated trigger "fires," and a set of logics or actions takes place. The logic is contextual in nature and allows services and/or user specific actions to be defined and executed. This may be sending or pushing relevant information to an appropriate client device. As with aspects, aspect triggers may be expanded to encapsulate a variety of non-presence indicators such as location.

The present systems and methods include a mechanism for an arbitrary number of aspects as required by the service/presence platform. This may include a set of common aspect triggers such as "availability", "opt-in", "reachable", among others, as well as application specific triggers. A method exists in one embodiment within the presence platform or management interface for associating an appropriate set of aspect triggers with a given service. Association of aspect triggers is contextual in nature and may apply at different levels. For example, a given aspect trigger may apply to a service enabler such as OMA push-to-talk over cellular PoC compliant services. Further, the trigger may be applicable or scoped at a class of service level. For example, this may apply "availability" to all class of services. Further, a trigger may be applicable at a user or group level.

Figure 9:
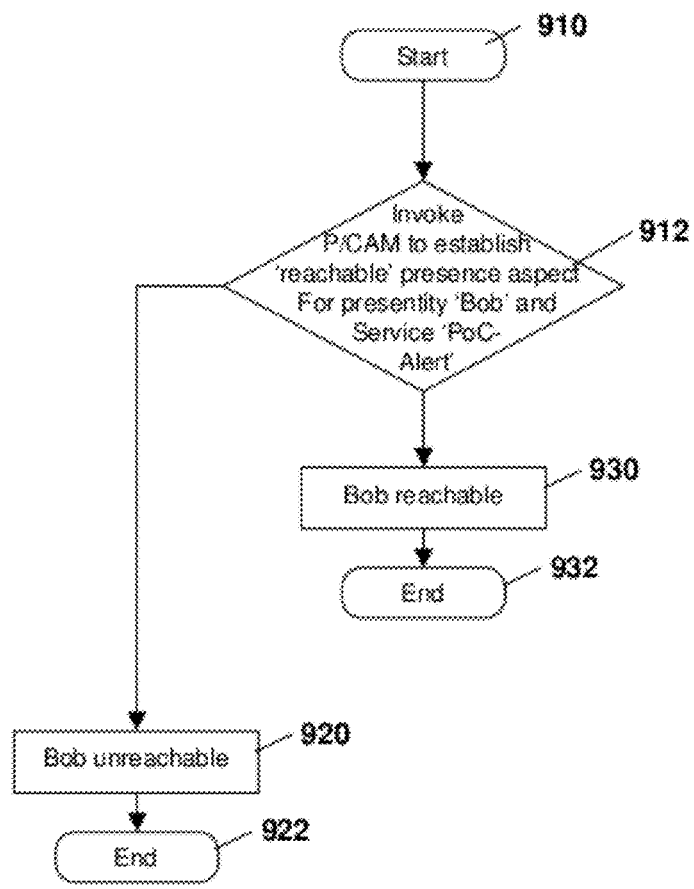
FIG. 9 is a flow diagram showing an example method to determine reachability when utilizing a P/CAM.

As will be appreciated with reference to FIGS. 2 and 9, the determination of whether a client is "reachable" is simplified by abstracting the aspect to the context aware layer. Further, a trigger can invoke the aspect or the aspect can be invoked on behalf of the trigger. This could be done by the underlying service enabler without any involvement from any client device. Triggers may invoke defined aspects and/or may incorporate logic consisting of rules/procedures which include the invocation of other aspects.

Aspect triggers by default will send an appropriate notification back to an associated client. However, it is possible for a service, class-of-service, enabler, user or group to modify/define a trigger which performs actions exclusively within the network without any client involvement.

Call flow is shown below with regard to FIG. 14. Aspect triggers do not require an associated subscription on behalf of a client or service. Given triggers are calculated or derived within the network, an interested observer, whether a client device or interworking service/enabler, may receive an unprompted or asynchronous notification as a result of an aspect trigger. Notifications may be handled using different communication means. For example, a client device may receive an SMS notification as a result of an aspect trigger firing. Additionally other services may receive OMA SIP/PUSH 1.0 notification or notifications in response to an associated trigger.

The contents of a notification are specific to the trigger and could include items such as the address of record for one or more presentities, an aspect indicator or mask for one or more aspects of relevance, a URL, a service or application routing mask for the receiving entity to ensure the aspect is directed or associated with the appropriate observer, among others.

Each client or service receiving a notification may respond according to the associated transport protocol. Additionally, it is possible for aspect trigger indications to be durable. That is, if a trigger is calculated for a given "interested observer" but that observer is unreachable, the aspect indication may be persisted or queued until the given user is able to properly receive the associated trigger. This is useful for scenarios where a given notification may outlast a given client user session.

Figure 14:
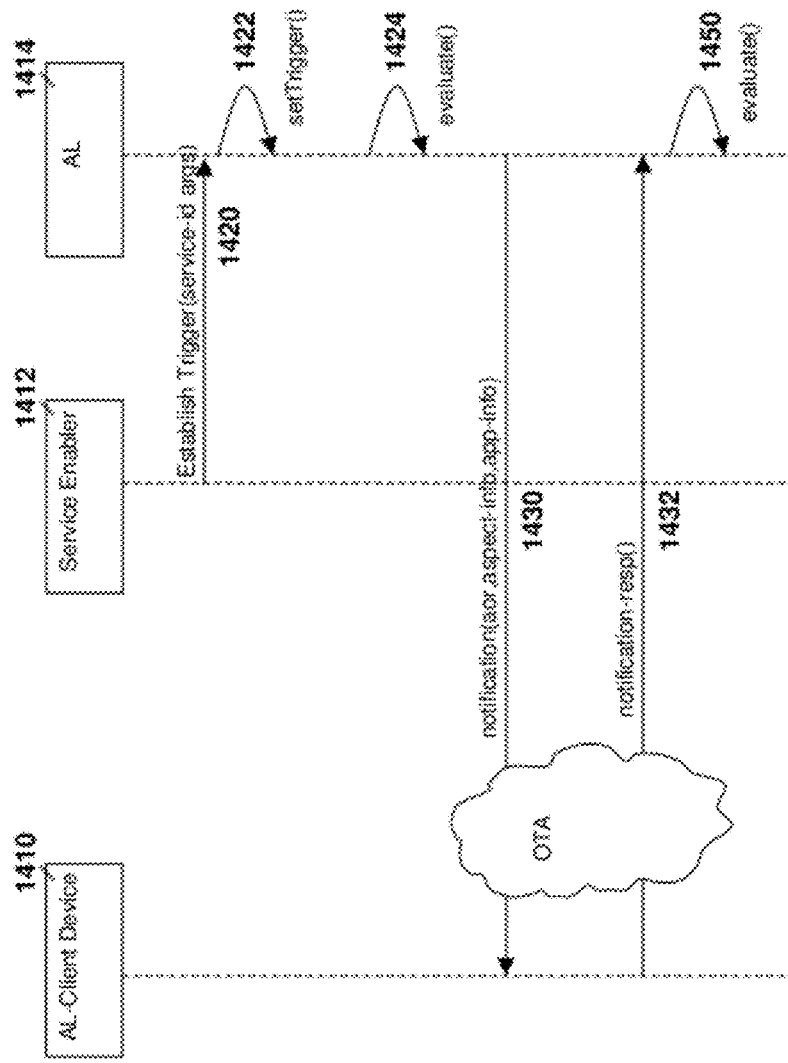
FIG. 14 is an example call flow diagram showing call flow for aspect triggers.

Referring to FIG. 14, a client device 1410 communicates with a service enabler 1412 which communicates, or is integrated with an aware layer (AL) 1414 (e.g., a context aware layer (CAL)).

As seen in FIG. 14, a trigger is established with message 1420, at which point AL 1414 sets a trigger as shown in 1422, and evaluates the trigger as shown by arrow in 1424.

Arrow 1422 establishes the trigger. This may include overriding or extending default steps for the trigger, obtaining/evaluating data from various sources and possibly sending out notifications to one or more users.

The evaluation shown by arrow 1424 shows that when a trigger fires an address of record, an aspect or application information is packaged and notification is sent to the client device or service. This notification is shown with arrow 1430.

In some cases a response or acknowledgement may be returned, and this is shown by arrow 1432.

As shown in FIG. 14, the AL 1414 could then continue to monitor or evaluate whether the trigger should fire as shown by arrow 1450.

The above policies, aspects and rules/thresholds could utilize a web services business process execution language in the form of WSBPEL 2.0. WSBPEL 2.0 provides a mechanism with which to express logical sequences required to implement presence rules or triggers (either whole or in part) in a P/CAM solution. A formal language (like PEEM/PEL) for specifying logic flows and invoking primitives (through web service description language (WSDL) type bindings) provides a presence context with limitless combinations of rules and/or triggers on behalf of an application or service. It should also be noted that more complex context flows may be created and chained together (e.g. through partner links) to carry out workflows and or business logic that is presence related and contextually relevant to the connected platform. Rules are able to invoke other rules, as nested rules. Similarly, triggers may also invoke rules where applicable. In other embodiments, expressing rules could be performed utilizing a traditional programming language (e.g. Java) or diagramming tools (e.g. a Sequence, Flow-Chart, or Use-Case diagram in UML being translated to a rule(s)).

As will be appreciated by those skilled in the art, the use of a context aware layer saves device and network resources by reducing the amount of information flowing between a mobile device and a network, and by removing processing from the mobile device.

For comparison with the present system and method, an example of information flow is shown hereafter with regard to FIG. 1. Specifically, when Alice wishes to send a PoC alert to Bob, the following XDM fetch could made:

```
GET /pidf-manipulation/users/sip:bob@example.com/index/~~/tuple/
    service-desciption/service-id=%22org.openmobilealliance:PoC-
    alert%22 HTTP/1.1
```

In response, a 'raw presence document' as illustrated below is returned:

```
HTTP/1.1 200/OK
Etag: "eti87"
Content-Type: application/pidf+xml
...
<?xml version="1.0" encoding="UTF-8"?>
<presence xmlns="urn:ietf:params:xml:ns:pidf"
   xmlns:pdm="urn:ietf:params:xml:ns:pidf:data-model"
   xmlns:rpid="urn:ietf:params:xml:ns:pidf:rpid"
   xmlns:caps="urn:ietf:params:xml:ns:pidf:caps"
   xmlns:op="urn:oma:xml:prs:pidf:oma-pres"
   xmlns:xsi="http://www.w3.org/2001/XMLSchema-instance"
   entity="sip:bob@example.com">
   <!-- Document returned to agent, from presentity Bob... -->
   <tuple id="a1232">
      <!-- User 'Bob' basic availability (available)... -->
      <status>
         <basic>open</basic>
      </status>
      <!-- User 'Bob' willingness (willing)... -->
      <op:willingness>
         <op:basic>open</op:basic>
      </op:willingness>
      <!-- User 'Bob' registration state... -->
      <op:registration-state>active</op:registration-state>
      ...
      <!-- User 'Bob' service description... -->
      </op:service-description>
         <op:service-id>org.openmobilealliance:PoC-
           alert</op:service-id>
         <op:version>1.0</op:version>
         <op:description>PoC Alert Service v1.0</op:description>
      </op:service-description>
      <!-- User 'Bob' contact means... -->
      <contact priority="0.90">sip:bob@example.com</contact>
      <!-- User 'Bob' deviceID... -->
      <pdm:deviceID>urn:uuid:d27459b7-8213-4395-aa77-
        ed859</pdm:deviceID>
      <timestamp>2007-02-22T20:07:07Z</timestamp>
   </tuple>
   <!-- Additional service tuple for PoC-Alert... -->
   <tuple id="a1233">
      <status>
         <basic>open</basic>
      </status>
      <op:willingness>
         <op:basic>open</op:basic>
      </op:willingness>
      <op:registration-state>active</op:registration-state>
      <caps:servcaps>
         <caps:audio>true</caps:audio>
         <caps:text>true</caps:audio>
         <caps:video>false</caps:video>
      </caps:servcaps>
      ...
      </op:service-description>
         <op:service-id>org.openmobilealliance:PoC-
           alert</op:service-id>
         <op:version>1.0</op:version>
         <op:description>PoC Alert Service v1.0</op:description>
      </op:service-description>
      <contact priority="0.90">sip:bob@example.com</contact>
      <pdm:deviceID>urn:uuid:d27459b7-8213-4395-aa77-
        ed859</pdm:deviceID>
      <timestamp>2007-02-22T22:07:27Z</timestamp>
   </tuple>
   <!-- Person definition for Bob (as authorized for class
     'forFriends'... -->
   <pdm:person id="a1234">
      <!-- Activities (meeting)... -->
      <rpid:activities>
         <rpid:meeting/>
      </rpid:activities>
      <rpid:class>forFriends</rpid:class>
      <!-- Place Additional service tuple for PoC-Alert... -->
      <rpid:place-type> <lt:office/> </rpid:place-type>
      <pdm:timestamp>2007-02-22T22:07:07Z</pdm:timestamp>
   </pdm:person>
   <!-- Device associated with PoC-Alert... -->
   <pdm:device id="a1235">
      <op:network-availability>
         <op:network id="IMS">
            <op:active>
         </op:network>
      </op:network-availability>
      <pdm:deviceID>urn:uuid:d27459b7-8213-4395-aa77-
        ed859</pdm:deviceID>
      <pdm:timestamp>2007-02-22T22:07:07Z</pdm:timestamp>
   </pdm:device>
</presence>
```

The above therefore illustrates the large (in terms of number of bytes or characters) presence document that is returned by conventional systems and methods, requiring significant battery resources to receive and network resources to transmit.

As will be appreciated by those skilled in the art, the resulting 'raw presence document' illustrated above could also be delivered by an OMA/Presence SIP:NOTIFY request (on behalf of an authorized watcher). An XDM fetch is used to simplify the network flows for this example.

Reference is now made to FIG. 9. FIG. 9 shows an example process on a mobile device when a context aware layer (P/CAM) is utilized. The method of FIG. 9 replaces and simplifies that of FIG. 2.

In FIG. 9, the process starts at block 910 and proceeds to block 912 in which the P/CAM is invoked to establish a 'reachable' presence aspect for 'Bob' and service 'PoC Alert'. Block 912 waits for the P/CAM to return a result and based on the result the process may proceed to block 920, which indicates 'Bob-unreachable', and ends at block 922. Alternatively, the process proceeds from block 912 to block 930 which indicates 'Bob reachable' and ends at block 932.

As will be appreciated from the above, reachability within a PoC alert client is now a single processing block (reachable/unreachable). It should be noted that the number of processing blocks for a given context aware application is reduced in proportion to the complexity and number of presence related functionalities associated with that application or service.

Comparing network bandwidth requirements between the traditional PoC client application outlined in FIG. 2, and the context aware client application in FIG. 9, an order of magnitude reduction in network overhead is provided. Comparing an XDM fetch using raw presence information for the traditional PoC client, with a SOAP method invocation (as an example deployment scenario) for the context aware 'reachable' presence aspect, the following is an example of a request:

```
POST /CAM-1 HTTP/1.1
...
HOST: pcam.example.com
Content-Type: text/xml; charset="utf-8"
...
<!-- SOAP request... -->
<SOAP-ENV:Envelope
  xmlns:SOAP-ENV="http://schemas.xmlsoap.org/soap/envelope/"
  SOAP-ENV:encodingStyle=
  "http://schemas.xmlsoap.org/soap/encoding/">
  <SOAP-ENV:Body>
  <pcam:reachable xmlns:pcam=
  "http://pcam.example.com/wsdl/oma-pres-pcam">
    <aor>sip:bob@example.com</aor>
    <service>org.openmobilealliance:PoC-alert</service>
  </pcam:reachable>
  </SOAP-ENV:Body>
</SOAP-ENV:Envelope>
```

The following is an example of a response:

```
HTTP/1.1 200/OK
Connection: close
...
Content-Type: text/xml; charset="utf-8"
...
<!-- SOAP response... -->
<SOAP-ENV:Envelope
  xmlns:SOAP-ENV="http://schemas.xmlsoap.org/soap/envelope/"
  SOAP-ENV:encodingStyle=
  "http://schemas.xmlsoap.org/soap/encoding/">
  <SOAP-ENV:Body>
    <pcam:reachableResp xmlns:pcam=
    "http://pcam.example.com/wsdl/oma-pres-pcam">
      <result>reachable</result>
    </pcam:reachable>
  </SOAP-ENV:Body>
</SOAP-ENV:Envelope>
```

The above therefore illustrates the reduction in data required to be transferred and also the reduction in processing required by a client.

Figure 10:
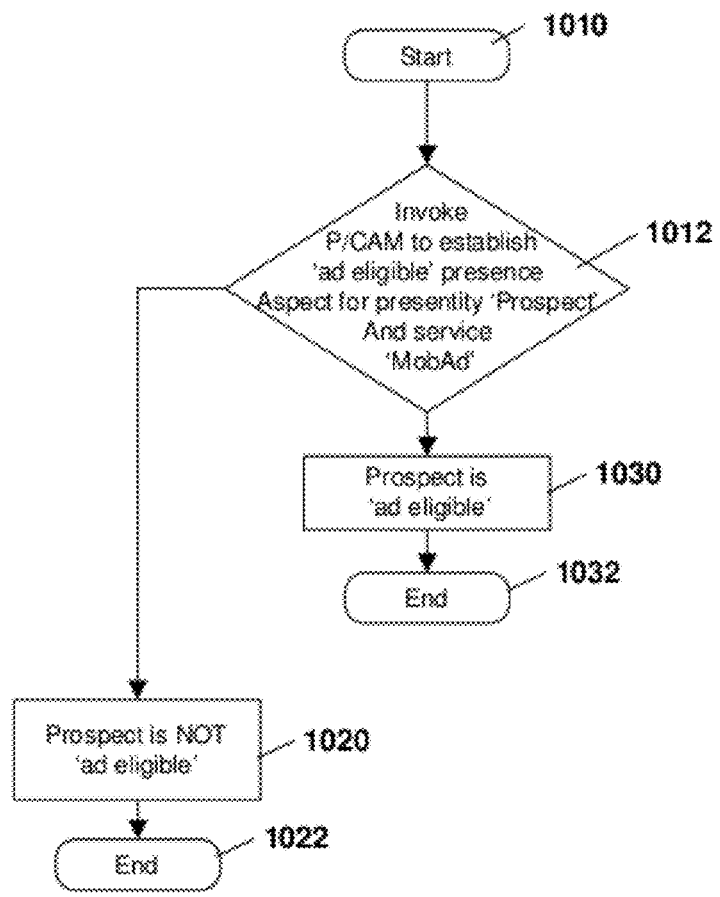
FIG. 10 is a flow diagram showing an example method to determine whether a prospect is eligible to receive advertisements utilizing a P/CAM.

A further example is illustrated below with reference to FIG. 10. FIG. 10 is provided to show the example where an ad Agency 'Ad-Inc.' wishes to reach consumers with a generic mobile advertising campaign. Ad-Inc. would like to optimize delivery of advertisements to the resource constrained devices based on specific criteria. For example, the ad-campaign consists of small video sequences, therefore the device must be reachable, have specific media capabilities, and have a modicum of battery level so that the ads can i) render properly on the device and ii) will not cause the device to lose significant battery so as to upset the prospective consumer and cause a negative association with the brand(s) being campaigned. A mobile advertising enabler "MobAd" specifies a new presence aspect known as 'ad-eligibility' to the P/CAM through the introduction of a Policy (e.g. PEEM/PEL) 'process' document with suitable logic flows. Similarly or in combination, the MobAd application could specify a location aspect.

In FIG. 10, the process starts at block 1010 and proceeds to block 1012 in which the P/CAM is invoked to establish the device is 'ad eligible', the presence aspect for the presentity prospect and the service 'MobAd'.

Block 1012 waits for a response from the P/CAM and depending on the result proceeds to block 1020 in which the prospect is deemed NOT 'ad eligible'. The process proceeds to block 1022 from block 1020 and ends.

Conversely, from block 1012, the process could proceed to block 1030 if the result from the P/CAM deems the prospect to be 'ad eligible'. As will be appreciated, 'ad eligible' could be considered a specific variant of the aspect 'eligible-session-participant' as defined in Table 2 above. The process then proceeds to block 1032 and ends.

The processing blocks related to the MobAd ad-eligibility presence aspect in FIG. 10 is significantly less than would be required by a stand-alone MobAd agent or client processing this metadata on its own. Additional complexity would need to be added over and above the logic flow shown in FIG. 2 to support the additional logic of resolving a threshold policy and media capabilities. This logic instead is incorporated as a new presence aspect (presence aspect building block) within a context aware layer and tied together to compute contextual presence on behalf of MobAd (ad-eligibility).

Figure 11:
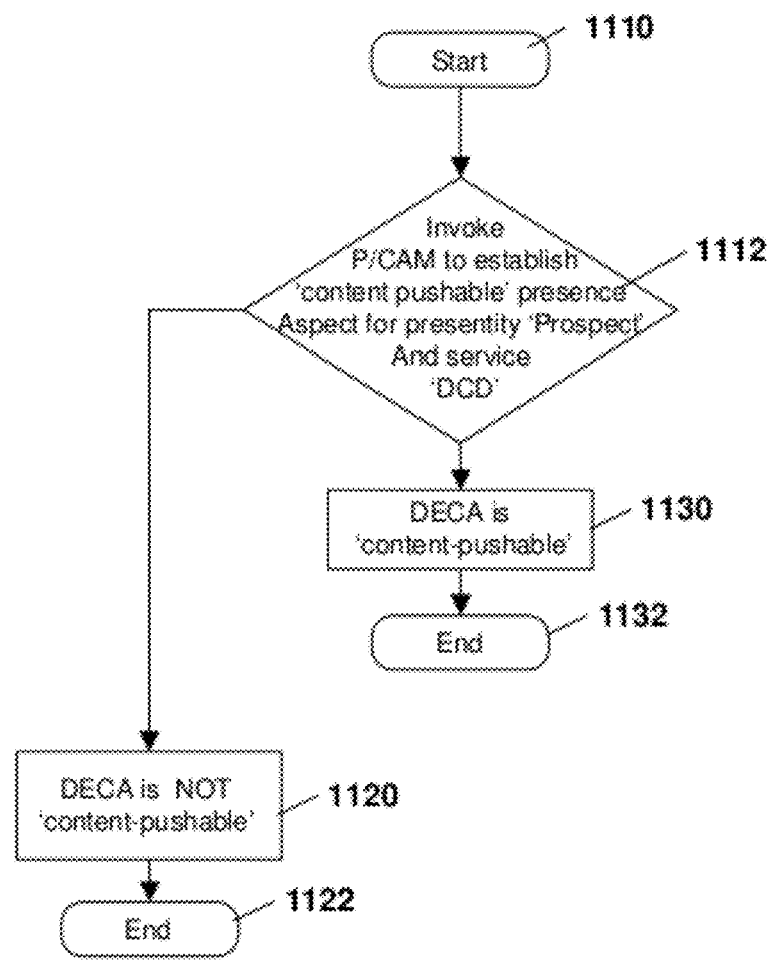
FIG. 11 is a flow diagram showing an example method to determine whether a push client can have content pushed to it utilizing a P/CAM.

A further example is illustrated with reference to FIG. 11. FIG. 11 illustrates the example a scenario in which a dynamic content delivery (DCD) Server wishes to send DCD content to a DCD enabled client application (DECA) via a DCD Client residing on a user's device. The DCD Server is considered a watcher of the DCD enabled client application (a presentity). The DCD Server would like to send content to the associated DCD enabled client application only if that DCD client is reachable and the storage capacity of the associated device is above a predefined minimal memory threshold after the DCD client has pushed the content. In this way, the DCD Server seeks to ensure that the pushed or otherwise sent content does not undesirably exhaust the device's storage capacity. To this end, DCD establishes a new presence aspect known as 'content-pushable' to the P/CAM by introducing a PEEM/PEL 'process' document with suitable logic flows. Again, this is analogous to 'eligible-session-participant' aspect, except here the criteria or aspect has been adapted, overridden or otherwise configured for a DCD enabler. In the present case the client is reachable, and has a given storage-free capacity.

Referring to FIG. 11, the process starts at block 1110. The process then proceeds to block 1112 in which the P/CAM is invoked to establish 'content pushable' presence aspect for presentity 'Prospect' and service 'DCD'. A result from the P/CAM determines whether the process proceeds to block 1120 and decides that the DECA is not 'content pushable' or to block 1130 and decides that the DECA is 'content pushable'.

The process proceeds to block 1122 or block 1132 from blocks 1120 and 1130 respectively, and ends.

The processing blocks related to the DCD content-pushable presence aspect in FIG. 11 are executed by the P/CAM so that the DCD Server simply invokes the rule in the P/CAM providing input parameters such as deviceID, service-id, and content-size. This rule can now be incorporated as a new presence aspect (presence aspect building block) within P/CAM and tied together to compute contextual presence on behalf of DCD (content-pushable).

The above is illustrated in the examples below.

Instant Messaging Client

One exemplary client application for the use of a context aware layer is an instant messaging application. The instant messaging application is called "MyFriendlyChat" herein.

In a university setting, for example, several friends may have the "MyFriendlyChat" application loaded onto their mobile device. In this example, user Alice is a university student having finished a day of classes. She is heading towards the college restaurant and wonders whether any of her friends are nearby to join her for dinner.

Alice takes out her wireless device and starts the "MyFriendlyChat" application and invokes the "Invite-nearby-friends-to-chat" function. This function utilizes both presence and location to return a list of friends that are within a predetermined distance and have a reachable status. The "MyFriendlyChat" application returns the active buddy list showing that Bob and Jane are nearby and reachable.

Alice enters a short message on her device letting her friends know that she is going to the college restaurant. Both Bob and Jane receive the message from Alice and reply that they will join her shortly.

The above shows a client application which utilizes both presence and location in order to make determinations and return relevant information to a user. In particular, the "invite-nearby-friends-to-chat" function requires knowledge of the location of nearby friends, as well as presence information to allow the instant messaging to occur.

Under a traditional model of instant messaging, a presence platform will need to be queried to obtain a list of raw data which must then be processed by the client application. Further, in this case a location platform would also be required to be queried to find the location of individuals in a buddy list.

According to the present disclosure, the aspects can be abstracted to a context aware layer that is located within the network. The context aware layer can be part of a platform such as the location and presence platform, part of a dedicated server, part of a presence or location server, or could be distributed among these entities. In some cases an agent for the context aware layer could also exist on the wireless device or on another computer.

The functionality of the client application is placed within the context aware layer thus providing for consistent results between varied client applications and also reducing signaling required between the mobile device and network.

For the above, the "MyFriendlyChat" client application functions as both a watcher and a presence source in an OMA/PRS realization and functions as a presence source in a context aware layer realization.

The context aware layer makes use of a predefined aspect to determine whether Bob and Jane can be reached. In this case, the aspect may be "eligible-session-participant" which is defined to select one or more presentities based on a given criteria. In this case, the aspect "eligible-session-participant" is overridden for application "MyFriendlyChat" to select from a group list those "buddies" who are "willing, reachable, and nearby". The overridden presence aspect is configured prior to the indication of any aspects from a "MyFriendlyChat" client executing on the wireless device.

With regard to call flows, the client application must determine who is willing, reachable, and nearby to initiate a message datagram to invite these "buddies" to dinner. To fulfill this functionality, it is assumed that the "MyFriendlyChat" application subscribes to members of Alice's buddy list through OMA PRS/RLS components.

The client application thereafter needs only to initiate communications towards eligible session participants based on the context aware layer result.

Various rules could be applied to the aspect to narrow it further. For example a limit could be placed on a subset of buddies when determining who is close by and reachable. Thus, the rule could be that only university buddies are returned when the request is made.

In a continuation of the above example, once Alice, Bob and Jane reach the restaurant, Alice could set an aspect trigger on her mobile device to alert her if any of her friends come within a certain distance of the restaurant within a predetermined time period. For example, Alice could set a trigger on her device to indicate that if any "buddies" come within 0.5 kilometers within the next half hour she should be alerted.

In this example, Jim meets these criteria and Alice receives a notification on her mobile device that Jim has entered the specified area and Alice can thus invite Jim to join the group.

As will be appreciated the above illustrates an example of an aspect trigger. Specifically, a trigger is established for the aspect "eligible-session-participant" and can be called, for example, "isEligibleSessionParticipant" which could cause an alert to be sent to Alice once true. As will be appreciated, such an alert could include an audible tone, vibration or any such notification to indicate to a user that the trigger conditions have been met.

Again, the use of a context aware layer facilitates a use of triggers, as well as reducing communications between the mobile device and the network, thereby saving battery life and processing power on the mobile device as well as network resources.

Mobile Advertising Scenario

In a further example of the above, car company XYZ Motor Cars wants an advertising campaign to coincide with the launch of a new sports-activity car model. XYZ Motor Cars hires Split-second Advertising Company to run the ad campaign and Split-second makes use of ABC Telecom as the wireless service/content delivery provider.

Split-second has established an advertising campaign for the new car model targeting individuals between 23 and 30 years of age with interests in biking, camping, kayaking. The ad contains various photos, video-clips or the like, of the new model being used with different sports activities.

Jack, Phyllis, Lynn and George have all agreed to receive advertising related content. Andrew is within the target market for XYZ Motors but has not opted to receive advertising content. Jack, Lynn and George are within the target market for XYZ Motors.

With the above scenario, ABC Advertising Company configures their wireless advertising platform for the advertising campaign. A trigger is established within the wireless advertising platform, where the trigger monitors individuals who meet the Split-second criteria for the given ad campaign, who have opted in to receive the advertising, are "reachable", and have an appropriate device with capabilities of receiving an associated video clip.

ABC turns on the campaign to coincide with the launch date of the new model for XYZ, resulting in the context aware layer trigger, defined above, firing.

A short time later, Jack, Lynn and George receive messages containing information related to the new vehicle being introduced by XYZ Motors. The ad content is adapted appropriately for each device. For example, Jack could receive a WAP-Push SMS with the WAP-URL to XYZ Motor's launch site while Lynn and George both receive multi-media messages (MMS) with a short video clip attached.

Since Phyllis and Andrew did not meet the criteria for the ad campaign, they are not contacted. However, if at a future time but still during the ad campaign, Andrew opts in to receive wireless advertising messages the XYZ Motor Company ad would be sent to Andrew.

The above is implemented utilizing various aspects. The "reachable" aspect can be used to determine whether Jack, Lynn and George can be reached to send advertising messages to. An aspect such as "opt-in" can be used to determine whether the user has opted in to receive advertising.

Triggers could also be utilized. In this case, a trigger such as "isEligibleSessionParticipant" is used to return one or more users who have opted into the wireless advertising and content delivery services, are reachable and have a device with an appropriate set of media capabilities. In this case, the default action for the aspect trigger could be to direct the context aware layer to initiate content appropriate to the user. Thus, for example, no direct over-the-air indication could be sent to an advertising application on the client device.

The context aware layer could include information such as MobileAdvertisingPreferences" defining a collection of mobile advertising specific preferences stored in an appropriate XDMS. The wireless advertising client located in the device may invoke this entity to return mobile advertising related preferences.

Other information could include "ContentDeliveryPreferences" having a collection of content-delivery preferences stored in an appropriate XDMS. The wireless advertising client or other component within the device may invoke this entity to return content-delivery/service/application/device preferences.

The advertising example provides for a context aware layer utilizing two separate enablers working together. Specifically a mobile advertising and content delivery enabler are used to achieve a specific function point. Such interactions are not possible under present services.

Research has shown that data transfer savings utilizing a context aware layer are between about 40% and about 75% under certain conditions. Thus, the use of the context aware layer provides savings of network resources and battery life on the mobile device.

The context aware layer further provides for the connection of multiple and varied client applications by allowing aspects, rules, policies and triggers to be defined at the context aware layer. This provides the advantage that the context aware layer can service multiple client applications and does not need to be recreated for each specific client application.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method performed by a server, the method comprising:
receiving a message from a presence client on a user device at the server, the message requesting establishment of a presence context that provides abstracted presence information to the presence client; and
establishing, through communication with a presence server that is adapted to store presence information in the form of raw data and state updates received from presentities, the presence context for an application or a service employed by the user device based on the message, the presence context providing the abstracted presence information for at least one of the service, the application or a class related to said application or said service,
wherein the presence context abstracts presence information by consolidating presence information from the presence server into a presence aspect using at least one of a rule and policy associated with at least one of the service, the application or said class for provision to the presence client on the user device by the server thereby reducing an amount of data to be transferred to the presence client.

2. The method of claim 1 wherein the message includes a service-id attribute that indicates the service to which the application is bound.

3. The method of claim 2 wherein the message further includes a user-id attribute that identifies a user of the user device.

4. The method of claim 2 wherein the service-id attribute indicates at least one of an Instant Message (IM) service and a Push-to-talk over Cellular (PoC) service.

5. The method of claim 1 wherein the presence context is defined by at least one of a policy, a rule and a trigger associated with the service.

6. The method of claim 1 wherein the server is integrated with an application server or an Open Mobile Alliance enabler.

7. The method of claim 6 wherein the application server is at least one of a Push-to-talk over Cellular (PoC) server, an Instant Message (IM) server and the presence server.

8. The method of claim 1 wherein the server is a dedicated server that is distinct from the presence server.

9. The method of claim 1 wherein the message includes a service-id attribute that corresponds to a class of service, the class of service grouping the application or said service with other applications or other services, respectively, based on a mutual characteristic.

10. The method of claim 9 wherein the mutual characteristic is employment of similar or common presence aspects.

11. The method of claim 9 wherein the service-id attribute identifies a policy that at least partially defines the presence context, the policy specifying a treatment of a presence aspect by the server.

12. The method of claim 11 wherein the presence context is further defined by at least one of a rule and a trigger based on the presence aspect.

13. A non-transitory computer-readable medium storing instructions that cause a processor to execute a server configured to perform a method comprising:
receiving a message from a presence client on a user device at the server, the message requesting establishment of a presence context that provides abstracted presence information to the presence client; and
establishing, through communication with a presence server that is adapted to store presence information in the form of raw data and state updates received from presentities, the presence context for an application or a service employed by the user device based on the message, the presence context providing the abstracted presence information for at least one of the service, the application or a class related to said application or said service,
wherein the presence context abstracts presence information by consolidating presence information from the presence server into a presence aspect using at least one of a rule and policy associated with at least one of the service, the application or said class for provision to the presence client on the user device by the server thereby reducing an amount of data to be transferred to the presence client.

14. A network device comprising:
a communication portion configured to receive a message from a presence client on a user device, the message requesting establishment of a presence context that provides abstracted presence information to the presence client; and a server configured to establish, through communication with a presence server that is adapted to store presence information in the form of raw data and state updates received from presentities, the presence context for an application or a service employed by the user device based on the message, the presence context providing the abstracted presence information for at least one of the service, the application or a class related to said application or said service, wherein the presence context abstracts presence information by consolidating presence information from the presence server into a presence aspect using at least one of a rule and policy associated with at least one of the service, the application or said class for provision to the presence client on the user device by the server thereby reducing an amount of data to be transferred to the presence client.

15. The network device of claim 14 wherein the message includes a service-id attribute that indicates the service to which the application is bound.

16. The network device of claim 15 wherein the message further includes a user-id attribute that identifies a user of the user device.

17. The network device of claim 15 wherein the service-id attribute indicates at least one of an Instant Message (IM) service and a Push-to-talk over Cellular (PoC) service.

18. The network device of claim 14 wherein the presence context is defined by at least one of a policy, a rule and a trigger associated with the service.

19. The network device of claim 14 wherein the presence server is configured on the network device.

20. The network device of claim 14 wherein the message includes a service-id attribute that corresponds to a class of service, the class of service grouping the application or said service with other applications or other services, respectively, based on a mutual characteristic.

21. The network device of claim 20 wherein the mutual characteristic is employment of similar or common presence aspects.

22. The network device of claim 20 wherein the service-id attribute identifies a policy that at least partially defines the presence context, the policy specifying a treatment of a presence aspect by the server.

23. The network device of claim 22 wherein the presence context is further defined by at least one of a rule and a trigger based on the presence aspect.

* * * * *

UNITED STATES PATENT AND TRADEMARK OFFICE
CERTIFICATE OF CORRECTION

PATENT NO. : 8,255,482 B2  
APPLICATION NO. : 12/333784  
DATED : August 28, 2012  
INVENTOR(S) : Brian Edward Anthony McColgan et al.

Page 1 of 1

It is certified that error appears in the above-identified patent and that said Letters Patent is hereby corrected as shown below:

On the Title Page

Right column, line 1, under "OTHER PUBLICATIONS", replace "PCT/CA20081002160" with --PCT/CA2008/002160--.

Signed and Sealed this
Eighteenth Day of December, 2012

David J. Kappos
*Director of the United States Patent and Trademark Office*